(12) United States Patent
Han

(10) Patent No.: US 11,059,382 B2
(45) Date of Patent: Jul. 13, 2021

(54) BATTERY BOX REPLACEMENT SYSTEM

(71) Applicant: Lei Han, Beijing (CN)

(72) Inventor: Lei Han, Beijing (CN)

(73) Assignee: Lei Han, Beijing (CN)

( * ) Notice: Subject to any disclaimer, the term of this patent is extended or adjusted under 35 U.S.C. 154(b) by 584 days.

(21) Appl. No.: 15/737,322

(22) PCT Filed: Jul. 3, 2016

(86) PCT No.: PCT/CN2016/088289
§ 371 (c)(1),
(2) Date: May 3, 2018

(87) PCT Pub. No.: WO2017/020674
PCT Pub. Date: Feb. 9, 2017

(65) Prior Publication Data
US 2018/0251102 A1 Sep. 6, 2018

(30) Foreign Application Priority Data
Aug. 4, 2015 (CN) .......................... 201510478027.6

(51) Int. Cl.
*B60K 1/04* (2019.01)
*B60L 53/80* (2019.01)
(Continued)

(52) U.S. Cl.
CPC ............. *B60L 53/80* (2019.02); *B60L 50/64* (2019.02); *B60L 50/66* (2019.02); *H01M 50/20* (2021.01);
(Continued)

(58) Field of Classification Search
CPC .......... B60L 53/80; B60L 50/66; B60L 50/64; B60L 53/65; B60L 53/68;
(Continued)

(56) References Cited

U.S. PATENT DOCUMENTS 8,720,617 B2 * 5/2014 Peng ..................... B62D 47/02
180/65.1
2004/0053090 A1 * 3/2004 Hanson ............... H01M 8/0438
429/406

(Continued)

FOREIGN PATENT DOCUMENTS

CN 201825013 U 5/2011
CN 102673534 A 9/2012
(Continued)

OTHER PUBLICATIONS

Barreras et al., A novel BEV concept based on fixed and swappable li-ion battery packs, 2015, IEEE, p. 1-9 (Year: 2015).*
(Continued)

*Primary Examiner* — McDieunel Marc

(57) ABSTRACT

A battery pack replacement and explosion-proof system: Start to control the second battery pack robot system and the ferry robot to uninstall and install the first battery pack and the second battery pack; the second connection point of the first power supply protector's grounding conductor unloads and absorbs the large current entering along the first power line; the third connection point unloads and absorbs the large current along the second power line; the fifth connection point of the second power surge protector unloads and absorbs the large current along the third power line; the sixth connection point unloads and absorbs the large current along the fourth power line; the first connection point and the fourth connection point unloads and absorbs the large current along the first and the second control line and signal lines of BMS, various parts of the grounding conduct currents into the earth through the conductive tyre.

4 Claims, 12 Drawing Sheets

Figure 1:
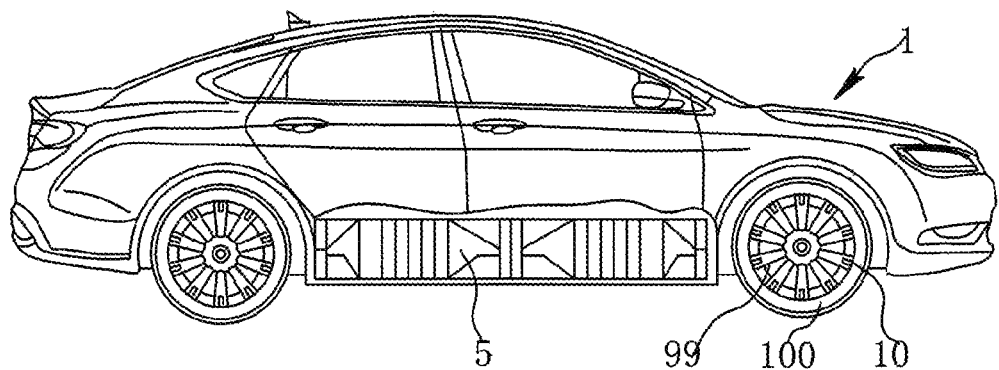

(51) Int. Cl.
*B60L 50/60* (2019.01)
*B60L 50/64* (2019.01)
*H01M 50/20* (2021.01)
*H01M 50/24* (2021.01)
*H01M 50/578* (2021.01)
*H01M 50/572* (2021.01)

(52) U.S. Cl.
CPC ......... *H01M 50/24* (2021.01); *H01M 50/578* (2021.01); *B60K 1/04* (2013.01); *B60K 2001/0472* (2013.01); *H01M 50/572* (2021.01); *H01M 2220/20* (2013.01); *Y02T 90/12* (2013.01)

(58) Field of Classification Search
CPC ............... B60L 2240/545; B60L 1/003; B60L 2200/18; B60L 2240/34; B60L 2240/547; B60L 2240/549; B60L 2240/622; B60L 2240/70; B60L 3/0046; B60L 3/12; B60L 53/305; B60L 53/66; B60L 53/67; B60L 58/12; B60L 58/13; B60L 11/1874; B60L 11/1877; B60L 2200/28; B60L 2250/16; B60L 53/60; B60L 58/26; B60K 1/04; B60K 2001/0416; B60K 2001/0472; B60K 2001/0411; B60K 2001/0422; B60K 2001/0444; B60K 2001/0455; B60K 2001/0466; B60K 2001/0477; B60K 17/22; B60K 2001/001; B60K 2001/0405; B60K 2001/0438; Y02T 90/12; Y02T 10/70; Y02T 90/14; Y02T 10/7072; Y02T 90/16; Y02T 90/167; B60Y 2200/143; B60Y 2400/61; H02J 7/0027; H02J 7/0042; H02J 7/34; H02J 7/342; Y02P 90/60; Y04S 30/14; B60S 5/06; G07C 5/008; H01M 2220/20; H01M 2/1083; H01M 2/1094; H01M 2/34; H01M 2/345; G05B 23/0213
See application file for complete search history.

(56) References Cited

U.S. PATENT DOCUMENTS

| | | |
|---|---|---|
| 2014/0100071 A1 | 4/2014 | Kimes |
| 2019/0126775 A1* | 5/2019 | Han .................. B60L 58/13 |

FOREIGN PATENT DOCUMENTS

| | | |
|---|---|---|
| CN | 204323021 U | 5/2013 |
| CN | 104723855 A | 6/2015 |
| JP | 2013038002 A | 2/2013 |

OTHER PUBLICATIONS

Brown et al., ChargeCar community conversions: Practical, electric commuter vehicles now!, 2012, IEEE, p. 1-7 (Year: 2012).*
Rothgang et al., Challenges in battery pack design, 2012, IEEE, p. 1-6 (Year: 2012).*
Hansen et al., Full system nickel-metal hydride battery packs for hybrid electric vehicle applications, 2002, IEEE, p. 253-260 (Year: 2002).*
International Searching Authority, International Search Report, dated Oct. 17, 2016, 3.

* cited by examiner

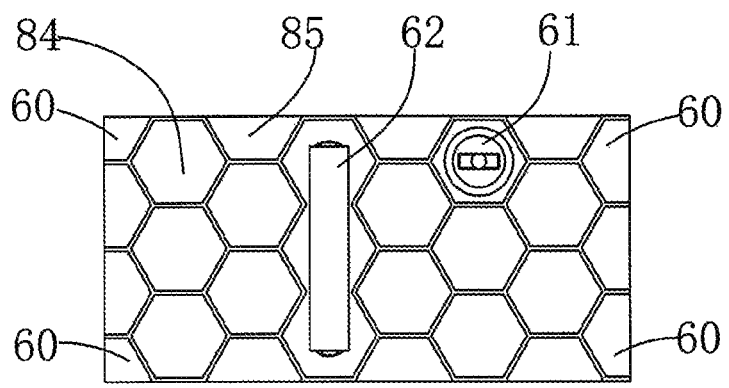
FIG. 18
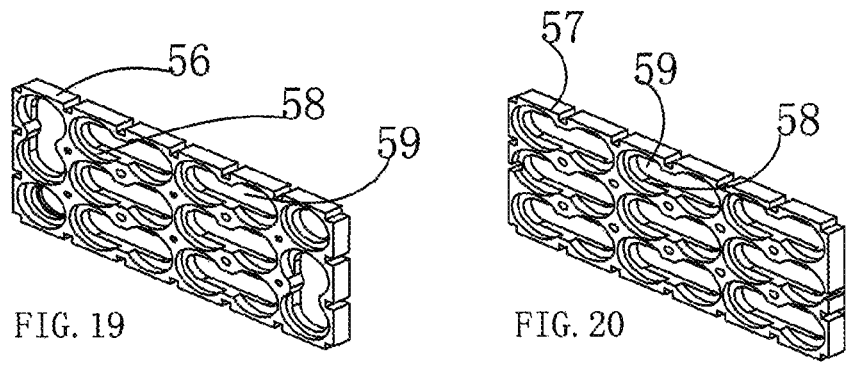
FIG. 19
FIG. 20
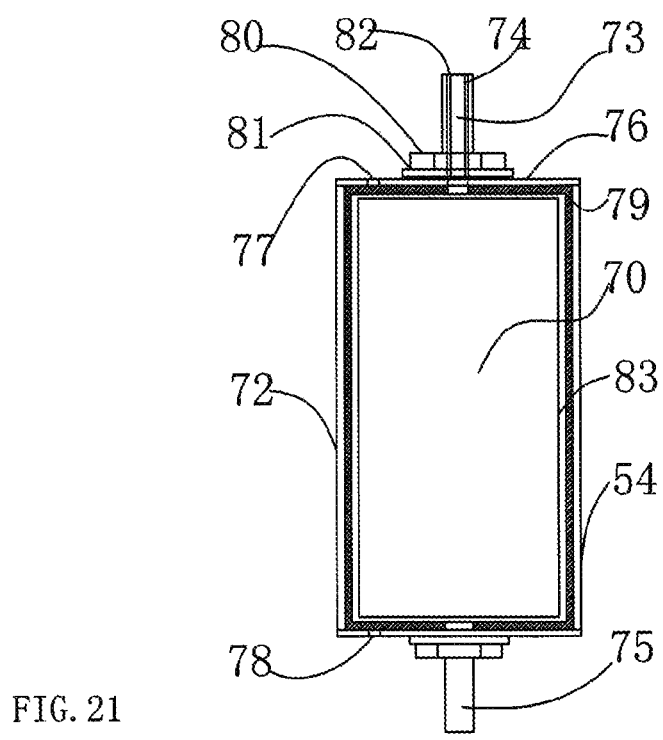
FIG. 21

BATTERY BOX REPLACEMENT SYSTEM

TECHNOLOGY FIELD

This invention relates to the Internet of things, the key components of electric vehicles and the electric vehicle's manufacturing field, is particular to the battery pack replacement and explosion-proof system based on Internet of things on electric vehicle's chassis.

TECHNOLOGY BACKGROUND

1. The Internet of things (IOL) is based on several technologies, such as radio frequency identification (RFID), infrared sensors, Global Positioning System (GPS), laser scanners and other information sensing equipment. According to the agreed protocol, Anything is connected to the Internet for information exchange and communication to achieve a network concept of intelligent identification, positioning, tracking, monitoring and management.

2. The Robot is automatic machine device that executes work. It can not only accept human command, but also run the prearranged program, and it can also act on the principle based on artificial intelligence technology.

3. The technology introduction of the most advanced power surge protector (SPD) in the world, the signal line and power surge protector Its sine wave has the capacity to track the filter and special chemical packaging, and this patent technology includes surge protection and filtering technology, which are in line with the technology requirements of electromagnetic pulse protection. SPD and the signal lines and control circuit protector have the following advantages: With the multilevel protection mechanism, the residual pressure can reach 0 V. The surge voltage after diversion is generally between 2.5 KV and 15 KV. Devices that equipped with power surge protector (SPD) can achieve extremely low residual pressure, and zero volt can be reached in some special industry.

The power surge protector (SPD): the response time of SPD and the signal line protector is less than 1 nanosecond, which can prevent the second lightning, induced lightening from happening and protect the electric internal current transient voltage suppressor (TVS) effectively. The response time of TVS diode is less than 1 nanosecond. The shell adopts National Electric Manufacturers Association (NEMA) 4 standard, and it is waterproof, fireproof, explosion-proof and anti-static. The patented sine wave ORN tracking technology has the capacity to eliminate surge and harmonic wave accurately. The one and only chemical packaging patent technology has the capacity to ensure the devices' reliable performance in a long time. The special chemical seal can rapidly absorb the heat produced during the process of surge protection. The true 10 mode (full mode) protection has the capacity to block all possible channels of SPD and the signal lines and control circuit protector have full mode protection to blocking the channel between the lines and between the lines and the ground to create a perfect protection.

The capacitor design is hybrid multi-module with both thermal insurance and electric insurance. SPD and the signal line protector have patented sine wave tracking technology, special chemical packaging, and nanosecond TVS components, ten modes protection and diversified module cannot release energy through the ground. (Reference: American Company Product Specification Series).

This invention make use of the advantages and overcomes the disadvantages of the following patents and patent applications.

1. CN201510067192.2 Electric vehicle battery pack's fast replacement method and fast replacement system.
2. CN201420173472.2 The elastic sealing structure of the electrical apparatus to electric battery pack.
3. CN201320802525.8 A kind of battery pack.
4. CN201310612437.6 A robot manipulator control system.
5. CN201410053423.X The electric vehicle's battery pack replacement system composed of a number of computer robots.
6. CN201320863239.2 The battery power supply system that reduces the burning probability of the battery pack of the electric vehicle.

4. The electric vehicle has the vehicle-hold power, driving the wheels with the motor, which is an line with the requirements of the road traffic and safety regulations. At present, the development of electric vehicles in China has a good prospect. But because of the electric vehicle charging is not convenient, problems of lack of endurance limits electric cars' development in China and in the world. Nowadays, the fast charging battery technology can provide electricity in a short time, but this charging technology seriously damage the battery life. And the charging pile technology is not perfect, the special needs of using charging piles greatly reduces the efficiency of charging piles. In fact, the charging station built in underground parking in city can meet the electric vehicle's battery life requirements. The electric cars have two ways of battery pack replacement; replace the pack from one side and replace the pack from the bottom of electric car' chassis.

Invent Content

The existing electric vehicle has problems, such as the battery replacement is not automatic, short circuit combustion of battery pack after the electric car is hit, too large current of battery pack, insufficient burning. However, thus invention provides a battery pack replacement controlled by Internet of Things on electric vehicle's chassis and the anti-riot system, Internet of Things starts to control the first battery pack robot system and the ferry robot uninstall and install the first battery pack and the second battery pack. Start to control the second battery pack robot system and the ferry robot uninstalling and installation of the first battery pack and the second battery pack; the second connection point of the first power supply protector's grounding conductor unloads and absorbs the large current entering along the first power line; the third connection point unloads and absorbs the large current along the second power line; the fifth connection point of the second power surge protector unloads and absorbs the large current alone the third power line; the sixth connection point unloads and absorbs the large current along the fourth power line; the first connection point and the fourth connection point unloads and absorbs the large current along the first and the second control line and signal lines of BMS, various parts of the grounding conduct currents into the earth through the conductive tyre.

The adopted technology of the invention to solve the technical problems is as follows: The battery pack automatic replacement and explosion-proof system (5) on electric vehicle chassis (2) includes one first battery pack spot (32) and one second battery pack spot (33); the first battery pack spot (32) was set at the middle-front part of the electric vehicle chassis (2) while the second battery pack spot (33) was at the middle-back part. When in use, the first battery pack (3) will be placed in the first battery pack spot (32) and the second battery pack (4) will be placed in the second battery pack spot (33), which makes the barycenter of the vehicle to be at its middle part. Set one battery pack bracket wire channel (49) and one first battery pack's electrical connector seat (176) and one second battery pack's electrical connector seat (262) on the battery pack suspension bracket (220), then fix the battery pack suspension bracket (220) under the inner roof of the system (5) with screws through the first fixed port (50) and the second fixed port (51). Install one first battery pack robot control system (11) and one second battery pack robot control system (14) inside the system (5). The vehicle wheel (10) consists of the hub (99) made of metal and the tyre (100) made of conductive rubber, which can transfer current from the ground wire of each part to the ground.

The switching unit (222) consists of the first battery pack (3) and the second battery pack (4), which are both independent power supply set on the electric vehicle (1). The outlet end of the first battery pack (3) is connected to that of the second battery pack (4) in parallel. The first battery pack (3) is the priority power supply while the second battery pack (4) is the backup power supply. The switching unit (222) is configured as following: when the SOC of the first battery pack (3) is less than the predefined threshold value, it will be switched so the second battery pack (4) for power supply. SOC is short for State of Charge, referring to the ratio of charging capacity to rated capacity, represented by percentage. The battery has rated capacity, in a certain rate of charge for a certain time, we can get the charge capacity, and the charge capacity and the rated capacity ratio is SOC, the preset threshold is 5%-8%. On the inner line of the first battery pack's output is the first major relay (7), which is connected to the first diode (6) in parallel.

On the inner line of the second battery pack's outlet is the second major relay (8), which is connected to the second diode (9) in parallel. In normal driving, the first battery pack (3) generally supply power, and the first major relay (7) is on and the second major relay is off at this tune.

Both the first battery pack (3) and the second battery pack (4) contain several single battery (54) that can be separately disassembled. The first battery pack (3) and the second battery pack (4) contain N (N.gtoreq.1, and is integer) single battery (54) system acquisition board Lightweight Environmental Control Unit (LECU) and one master board of battery system (e.g., battery management unit (BMU)). The former mainly collects the voltage and the temperature of single battery (54). The latter mainly collects the current value inspected by the current sensor, which serves as the major reference for SOC calculation, BMU inspects the on and off state of the relay for safety monitoring.

When drive the electric vehicle 1, the switch unit (222) is configured as: switch off the first major relay (7), and the first battery pack (3) conducts external power supply through the first diode (6); switch on the second major relay (8), and the second batters pack (4) conducts external power supply through the second diode (8); when the voltage of the second battery pack (4) is greater than that of the first battery pack (3), switch off the first unbidirectional conducting diode (6). When stop the electric vehicle (1), the switch unit (222) is configured as: set the low pressure system of the first battery pack (3) into sleep mode by gateway controller. During the restart process of the electric vehicle (1), the low pressure system of the second batters pack (4) is on while that of the first battery pack (3) was off, thus to supply power only by the second battery pack (4).

Operation switch: when the first battery pack needs to be switched to the second battery pack (4), firstly, switch off the first major relay (7) of the first battery pack (3) and conduct external power supply through the first diode (6), then switch on the second major relay (8) of the second battery pack (4), at this moment, the two battery packs conduct external power supply together. Since the voltage of the second battery pack (4) is larger than that of the first battery pack (3), the first diode (6) will not conduct current from the opposite way and stop voltage output, thus these will be no voltage as rap or potential difference between the two battery packs. The gateway controller will make the low pressure system of the first battery pack (3) enter sleep mode and complete smooth switch.

Stop switch: when the SOC of the first battery pack (3) is too low, after stop the car, the low pressure system of (4) enters sleep state by the gateway controller. When restart, only need to start the electrical system of the second battery pack (4) to complete the switch.

Emergency handling: when the temperature of the first battery pack (3) suddenly reaches the warning temperature, such as 150.degree., the first battery pack (3) will be shifted to the second battery pack (4) immediately. If the temperature of the first battery pack (3) keeps rising after surpassing the warning temperature, the robot system (111) that controls the first battery pack (3) will be started at once. Under the drive of the engine, the first bracket (108) under the first link rod (113) will separate itself from the first battery pack (3) together with first link rod (113). The first bearing platform (257) on the first bracket (108) is gradually separated from the first fixed platform (226) of the first battery pack (3), and the first bracket (108) is separated from the first battery pack (3), which is automatically separated from the vehicle chassis (2) and falls onto the floor. When the temperature of the second battery pack (4) suddenly reaches the warning temperature, such as 150.degree., the second battery pack (4) will be shifted to the first battery pack (3) immediately. If the temperature of the second battery pack (4) keeps rising after surpassing the warning temperature, the robot system (14) that controls the second battery pack (4) will be started at once. Under the drive of the engine, the second bracket (109) under the first link rod (113) will separate itself from the second battery pack (4) together with the first link rod (113). The second bearing platform (252) on the second bracket (109) is gradually separated from the second fixed Platform (225) of the second battery pack (4), and the second bracket (109) separates from the second battery pack (4), which automatically separates from the vehicle chassis (2) and falls onto the floor. If both the first battery pack (3) and the second battery pack (4) both reach 150.degree. with the temperature keeping rising, the first robot system (11) and the second robot system (14) can be started at the same time to respectively get rid of the first battery pack (3) and the second battery pack (4).

Both the hydraulic controller (120) and the servo motor controller (127) are connected to the master controller (117) in the first battery pack robot control system (11) and the robot system (14). The hydraulic controller (120) is connected with the multichannel decompression amplifier (123) which is connected with electro-hydraulic proportional valve (124) that is used to drive the up-down moving cylinder (114) of the first link rod (113). The servo motor controller (127) is connected with the multichannel servo amplifier (125), which is connected to the servo motor (115) used to drive the first link rod (113). The servo motor (115) is connected to the first link rod (113) through the reducer (116). The hydraulic controller (120) is also connected with the displacement sensor (121) used to inspect the moving distance of the first link rod (113) and the pressure sensor (122) used to inspect the internal hydraulic oil pressure of the cylinder (114). The servo motor controller (127) is also connected with the photoelectric encoder (126) for detecting the revolution speed of the power output shaft of the reducer (116). The master controller (117) is also connected with the camera (118) used for recording robot hand movement and the display screen (119) used to display robot hand movement. The hydraulic controller (120) and the servo motor controller (127) communicate with the master controller (117) through the Controller Area Network (CAN) bus. The master controller (117) receives the remote terminal's instruction via the RS232 data line and distribute missions to the hydraulic controller (120) and the servo motor controller (127) to control the robot hand for series of movements by CAN bus. The output of the hydraulic controller (120) connected to the multichannel decompression amplifier (123), and controls the cylinders (114) through electro-hydraulic proportional valve (124). The output end of the servo motor controller (127) is connected to the multichannel servo amplifier (125), which is connected to the servo motor (115) to control the reducer (116) through the servo motor (115). The environment is collected by the camera (118), and the operation process of the robot hand is displayed on the display screen (119). The displacement sensor (121) is arranged on the robot hand to avoid collision with the external environment.

Steps of Replacing the Battery Pack (3) and the Battery Pack (4) Under the Battery Pack Replacement and Explosion-Proof System Controlled by Internet of Things on Electric Vehicle's Chassis:

Step 1: The driver of the vehicle (1) contacts the third monitoring station (292) using the vehicle mounted device though 3G/4G and other wireless network, and find out the nearest battery replacement station (221) for electric vehicles. When arrive the nearest battery replacement station (221), drive the vehicle (1) to the four-column car lifting machine (101), and start the remote battery replacement monitoring mode controlled by the third monitoring station (292) on the Liquid Crystal Display (LCD) screen of the vehicle mounted device.

Step 2: The operator of station (292) hands over the battery replacement procedure to the first monitoring station (293) through network, and the first monitoring station (293) starts remote monitoring. The vehicle battery replacement network enters working state from the waiting state. The ferry robot (103) walks to the first battery pack spot (32) under the battery automatic replacement system (5) of the vehicle 1 along the steel rail (104). The battery pack tray (159) holds against the first battery pack (3), and the operator of the first monitoring station (293) starts the first battery pack robot control system (11). Drove by the motor device, the first bracket (108) installed under the link rod (113) starts to be separated from the first battery pack (3). The first bearing platform (257) on the first bracket (108) is gradually separated from the first fixed platform (226) of the first battery pack (3), and then the bracket (108) is separated from the first battery pack (3) The ferry robot (103) drives the first battery pack (3) away from the first bearing platform (52), and the first battery pack robot control system (11) stops work. The ferry robot (103) carrying the first battery pack (3) walks to the battery unload place of the first stack robot (102) along the steel rail (104). Then the stack robot (102) unloads the first battery pack (3).

Step 3: The first stack robot (102) grabs the charged first battery pack (3) and put it onto the battery tray (159) on the top of the ferry robot (103).

Step 4: The ferry robot (103) walks to the four-column car lifting machine (101) along the rail (104). After the X/Y direction positioning of the ferry robot (103), the listing process of the robot is calculated by the difference between the output of the ultrasonic ranging sensor and the output of the hydraulic mechanism encoder, which serves as the input of the PID controller to control the proportional flow valve. The positioning is considered as precise when the hydraulic mechanism is lifted to the preset position. When the first monitoring station (293) sends the order of installing the first battery pack (3) to the ferry robot (103), the ferry robot (103) will hold against the first battery pack (3) to the first battery pack spot (32) on the battery pack automatic replacement system (5). The operator of the first monitoring station (293) starts the first battery pack robot control system (11) to push the first battery pack (3) and make the first fixed platform (26) of the first battery pack (3) enter the battery bracket first bearing platform (52). When the first connector plug (175) is closely linked to the first battery pack socket (176), the installation of the first battery pack (3) is completed, and the fast battery pack robot control system (11) stops work. Then the ferry robot (103) leaves the car lifting machine (101) along the rail (104).

Step 5: The ferry robot (103) walks to the four-column car lifting machine (101) along the rail (104), and reaches the second battery pack spot (33) of the second battery pack (4) under the vehicle chassis (2). The battery tray (159) holds against the second battery pack (4), and the operator of the first monitoring station (293) starts the second battery pack robot control system (14). Drove by the motor device, the second bracket (109) installed under link rod (113) starts to be separated from (113). The second hearing platform (252) on the second bracket (109) gradually separates from the second fixed platform (225) of the second battery pack (4), and the second bracket (109) is separated from the second battery pack (4), then the robot system (14) stops work. The second battery pack (4) falls onto the battery tray (159) on the top of the ferry robot (103). The ferry robot (103) carrying the second battery pack (4) walks to the battery unload place of the first stack robot (102) along the steel rail (104). Then the stack robot (102) unloads the second battery pack (4).

Step 6: The first stack robot (102) grabs the charged the second battery pack (4) and put it onto the battery tray (159) on the top of the ferry robot (103).

Step 7: The ferry robot (103) walks to the four-column car lifting machine (101) along the rail (104). After the X/Y direction positioning of the ferry robot (103), the listing process of the robot is calculated by the difference between the output of the ultrasonic ranging sensor and the output of the hydraulic mechanism encoder, which serves as the input of the PID controller to control the proportional flow valve. The positioning is considered as precise when the hydraulic mechanism since lifted to the preset position. When the first monitoring station (293) sends installing order to the ferry robot (103), the ferry robot (103) will hold against the second battery pack (4) to the second battery pack spot (33) under the chassis (2) and the tray (159) pushes the second battery pack (4) to the second battery pack spot (33). The operator of station (293) starts the control system (14) to push the second battery pack (4) and make the first fixed platform (46) of the second battery pack (4) enter the battery bracket second bearing platform (53). The second connector plug (254) is closely linked to the second battery pack socket (262). When the installation of the second battery pack (4) is completed, the second battery pack robot control system

(14) stops work, and the ferry robot (103) leaves the car lifting machine (101) along the rail (104).

Step 8: When the battery replacement process is completed, the car lifting machine (101) descends, and the driver of the vehicle (1) drives away from the replacement station.

Step 9: The first monitoring station (293) sends the signal of completing the battery replacement, then the entire battery replacement station (221) returns to the original spot. The first battery pack's case (223) and the second battery pack's case (224) both are made of the battery pack's case (199), which contains the upper lid (200) and the base (201). The front side of the base (91) has a setting-in connector plug (203), which can be constructed as the first connector plug (175) or the second connector plug (254). The upper lid (200) of the case (199) is shorter than the trapezoidal frame of bottom margin (174) on the base (201).

Install the first temperature adjustment panel (12) and the second temperature adjustment pane (13) on the battery replacement system (5) with several fixing port (266). The panel (12) is installed over the first battery pack spot (32) while the panel (13) is installed over the second battery pack spot (33). The first connecting tube (95) and the second connecting tube (96) link the panel (12) and the panel (13) together, and the coolant inlet (97) and the coolant outlet (98) are set on the panel (12).

Put the first battery pack (3) into the first battery pack's case (223), the first shielding conduit (21) bent into 90.degree. and the second shielding conduit (22) bent into 90.degree. (both are made of magnetic and electronic conductive metal) are fixed inside the first battery pack's case (223), in which the first signal line protector (16) is also installed. The first control line and the BMS signal line (20) enter the inner front of the first battery pack's case (223) along the first shielding conduit (21) and connect to the first connecting spot (19) with the first conduit (17) of the first signal line protector (16). The first signal line protector's second wire 18 is connected with the signal outlet line (69) of the first battery pack (3). The first control line, the BMS signal line (20) and the first signal line protector 16 are in series connection. The first connection spot (19) unloads and absorbs current flowing along the first control line and the BMS signal line (20). The first signal line protector's ground line (15) is connected to the first power surge protective devices ground line (30). Install the first power's SPD 31 inside the first battery pack's case (223), the first power line (23) enters into the first battery pack's case (223) along the second shielding conduit (22) and is connected at the second connecting spot (25) with the first conduit (28) of the first power. The first power line (23) is connected to the positive terminal (66) of the first battery pack 3. The second power line (24) enters into the first battery pack's case (223) along the second shielding conduit (22) and is connected at the second connecting spot (27) with the second conduit (27) of the first power. The second power line (24) is connected to the negative terminal (71) of the first battery pack (3). The ground line (30) of the first power's is connected to the forth electrical contact (198) of the plug (176). The second connecting spot (25) unloads and absorbs the current flowing along the first power line (23). The third connecting spot (27) unloads and absorbs current flowing along the second power line (24). Install the second power SPD (229) inside the first battery pack's case (223). The first conduit (227) of the third power's SPD is connected to the outer surface of the first battery pack (3). The second conduit (228) of the third power's SPD is connected to the inner surface of the first battery pack's case (223), which can unload and absorb the current induced from the first battery pack's case (223).

The ground line (230) of the third power' is connected to the first power surge protector's ground line (30). The first signal line protector's ground line (15), the first power stage protector's ground line (30) and the ground line (230) of the third power's are in equipotential connection. Conduct the current from the above three lines to the ground line forth electrical contact (198), then to the ground system of the vehicle (1), finally to the earth through the wheel.

Put the second battery pack (4) into the second battery pack's case (224), the third shielding conduit (38) bent to 90.degree. and one forth shielding conduit (41) bent to 90.degree. (both are made of magnetic and electronic conductive metal) are fixed inside the second battery pack's case (224), in which the second signal line protector (35) is also installed. The second control line and the BMS signal line (40) enter the inner front of the second battery pack's case (224) along the third shielding conduit (38) and is connected to the forth connecting spot (39) with the second signal line protector's second wire (37). The first conduit (30) of the second signal line protector (35) is connected with the printed circuit board (PCB) signal out line (69) of the first battery pack (3). The first control line, the battery management systems (BMS) signal line (20) and the second signal line's protector (35) are in series connection. The forth connection spot (39) unloads and absorbs current flowing along the second control line and the BMS signal line (40). The second signal line protector's ground wire (34) is connected to the ground line (47) of the second power's. Put the second battery pack (4) into the second battery pack's case (224) the third shielding conduit (38) bent into 90.degree. and the forth shielding conduit (41) bent into 90.degree. are made of magnetic and electronic conductive metal are fixed inside the second battery pack's case (224). Install the third power's surge protector (48) inside the second battery pack's case (224), the third power line (42) enters into the second battery pack's case (224) along the forth shielding conduit (41) and connects to the fifth connecting spot (43) with the second wire (238) of the second power. The third power line (42) is connected to the positive terminal (66) of the second battery pack (4). The forth power line (44) enters into the second battery pack's case (224) along the forth shielding conduit (41) and is connected to the sixth connecting spot (45) with the second power surge protector's first wire (237). The forth power line (29) is connected to the negative terminal (71) of the second battery pack (4). The ground line (47) of the second power's is connected to the ninth electrical contact (253) of the second plug (254). The fifth connecting spot (43) unloads and absorbs the current flowing along the third power line (42). The sixth connecting spot (45) unloads and absorbs current flowing along the forth power line (44). Install the forth power's SPD (234) inside the second battery pack's case (224). The first conduit (232) of the forth power's SPD is connected to the outer surface of the second battery pack (4). The second wire (233) of the forth power's SPD is connected to the inner surface of the second battery pack's case (224), the ground line (235) of the forth power's connected to the ground line (47) of the second power's SPD. The ground line (47) of the second power's SPD, the ground line (235) of the forth power's SPD and the second signal line protector's ground wire (34) are in equipotential connection. Conduct the current from the above three lines to the ground line ninth electrical contact, then to ground system of the vehicle (1), final to the earth through the wheel (10).

The SPD is usually connected to the power line in parallel in the circuit.

The battery pack shell (63) consists of the frame, the upper lid (64) and the lower lid (65). The positive terminal (66) and the negative terminal (71) are set on the upper lid (64). The circuit board (67) is connected to each battery through wires. On the circuit board, the signal output line (69) is set on it. Inside the battery pack shell (63) there are the single battery (54) with several positive and negative terminals set on both sides, and the battery array consists of adjacent batteries with opposite polarity in combination permutation. The positive and negative electrodes of the adjacent batteries are connected through the connection strap (55). On the top surface and bottom surface of the battery array, the upper support seat (56) and the lower support seat (57) are respectively set, and they are connected through several support column (60). The circuit board protection cover (68) is set on the board (67), and the signal output line (69) is out from the circuit board protection cover (68). The connecting line of the positive terminal (73) and the negative terminal (75) in the single battery (54) both form 90.degree. angles with the extended line of the top lid (64) and the extended line of the bottom lid (65).

The battery cells (84) is arranged as a regular hexagon, and the battery cells (85) is arranged as half regular hexagon. The two arrangement methods make two kinds of the battery monomer (54). The elastic cushion (61) is set between the bottom surface of the groove (58) of the top support seat (56) and the bottom support seat (57) and the two sides of the battery. The elastic cushion (61) is in circular shape, and it is made of ethylene propylene diene monomer (EPDM) material. Insulated and heat conductive tape (62) are stuck on the connecting straps. The groove (58) are install on the top support seat (56) and the bottom support seat (57) to put battery in. The intercommunicating pore (59) that can expose battery electrodes are set in the mutually connected battery indentations The lithium battery is positive six prismatic. The first edge (86), the second edge (87), the third edge (88), the forth edge (89), the fifth edge (90) and the sixth edge (91) of the single battery are same in length, which includes the electric core (70), the inner shell (83), the outer shell (72), the positive pole (73) and the negative pole (75). The inner shell (83) covers the electric core (70), the outer shell (72) covers the inner shell (83), the positive pole (73) and the negative pole (75) are respectively at the middle of the upper side surface and lower side surface of the outer shell (72). The cover plate (76) is set on the upper side surface of the outer shell (72), on which there is the first glue infection port (77). The second glue injection port (78) is set at the corresponding place of the lower side surface of the outer shell (72) and the first glue injection port (77). Between the inner shell (83) and the outer shell (72), the high thermal-conductive electronic silica gel (79) is filled. Both the positive pole (73) and the negative pole (75) are screwed with the matching nut (80). The pad (81) is set between the contact surface of the nut (80) and the outer shell (72). At the middle of the positive pole (73), the liquid injection port (82) is set, beside which there is the air-vent (74). With high thermal conductive electronic silica gel (79) filled between the outer shell and the inner shell, the heat diffusion of the electric core (70) becomes more even, and can quickly conduct heat to the outer shell (72) and efficiently improve the seismic capacity and tightness of the lithium battery. The pad (81) is used to fix the electric core (70) and insulate the outer shell (72), which improves electrical insulation and stability. The liquid injection port (82) and the air-vent (74) have the functions of injecting liquid and reducing pressure for the electrolyte of lithium battery.

The battery is in ½ regular prism structure. The seventh edge (92), the eighth edge (93) and the ninth edge (94) of the single battery are same in length.

The ferry robot (141) has X axis, Z axis, R axis, three degrees of freedom, respectively being the linear walking mechanism (142), the hydraulic lifting mechanism (143) and the angle deviation mechanism (144). The linear walking mechanism (142) is at the bottom of the ferry robot (141), containing the pulley (148), the universal shaft 145, the belt (149), the first servo motor (150), the first reducer (151) and the base (152); the two pulleys in front are the motor device of the robot, connected to a set of universal shaft. The two pulleys at the back are slave drive device. The firth servo motor (150) and the matching first reducer (151) are in expanding sleeve connection. Motor transfer between the first reducer (151) and the pulley (148) completed through the belt (149). The pulley (148) does linear walking on the sliding rail. Under the linear walking mechanism (301), there is three photoelectric switches, which respectively cooperates with the origin baffle and the front and rear limit baffles, providing in-place switch signal for the programmable logic controller (PLC) control system (161) to realize robot original spot searching and resetting and avoid crossborder operation. The front limit battle, the origin baffle and the rear limit baffle are arrayed in order along the linear sliding rail, and the origin baffle set between the front limit baffle and rear limit baffle. The hydraulic lifting mechanism (143) is above the base of the linear walking mechanism (142), containing two hydraulic telescopic cylinders. The first level hydraulic cylinder (153) is under the second level hydraulic cylinder (154). When the first level hydraulic cylinder (153) fully extends, the second level hydraulic cylinder (154) begins to stretch. At one side of the first level hydraulic cylinder (153) and the second level hydraulic cylinder (154) is respectively soldered crossbeams and antirotating beams, which cooperate with the two anti-rotating holes on the soldering beam of the first level hydraulic cylinder (153) and the soldering beam of the base to avoid rotating during the process of battery lifting along with the hydraulic lifting mechanism (143). At the other side of the first level hydraulic cylinder (153) and the second level hydraulic cylinder (154), the rack (146), the encoder (147), the battle and the first proximity switch. The baffle and the first proximity switch cooperates with each other. The first proximity switch is set at the bottom of the beam of the first level hydraulic cylinder (153), when the first level hydraulic cylinder (153) fully extends, the baffle triggers the switch signal of the proximity switch and the second level hydraulic cylinder (154) starts stretching. The rack (146) on the side of the second level hydraulic cylinder (154) joggles with the encoder (147) through the gear. The lifting height of the second level hydraulic cylinder (154) is got by calculating the revolution of the encoder (147). The encoder (147) is connected with the PLC control system (161), which starts high speed counting. The angle deviation mechanism 144 is at the top of the hydraulic lifting mechanism (143), containing the mounting flange (155), the gear (156), the second servo motor (157) and the second reducer (158). The flange (155) is installed on the second level hydraulic cylinder (154), and the second servo motor (157), the second reducer (158) and the gear (156) are fixed on the flange (155). The small gear is installed on the second servo motor (157), while the large gear is installed on the second level hydraulic cylinder (154). The small gear and the large gear are joggled together and rotate along with the second servo motor (157). Under the large gear, the baffle is set here, and there are three second proximity switches on the mounting flange (155).

During rotating, the large gear triggers the signals of the left rotation limit, the right rotation limit and the galvanic reset switch to ensure the large gear rotate within the predetermined range. The battery tray (159) is installed on the angle deviation mechanism (144). The rotation center of the large gear and the gravity center of the battery tray (159) is the same one. Four stop blocks (160) are installed on the battery tray (159), and respectively couples with the four break-outs under the bottom of the battery box of the vehicle 1, which can realize slight adjustment and reliable fixing of the battery out box position. The ultrasonic ranging sensor (168) and the Digital Monitoring Products (DMP) sensor (169) are set on the battery tray (159). The ultrasonic ranging sensor (168) is used to measure the distance between the battery tray (312) and the vehicle chassis. The DMP sensor cooperates with the reflecting panel on the vehicle chassis to calculate the target spot of the reflecting panel and gain the horizontal angle deviation of the ferry robot (141) and the vehicle. The linear walking mechanism (142) and the hydraulic lifting mechanism (143) are in linkage. The angle correction mechanism (144) only starts working when the robot (141) linearly walks and vertically lifts to the preset position. The hydraulic lifting mechanism (143) only restarts working when the battery tray (159) on the angle correction mechanism (144) meets the expected effect. The linear walking mechanism (142) and the angle correction mechanism (144) adopts servo motor drive. The drive motor is connected with the corresponding encoder, and each encoder is connected with the corresponding driver. The driver sends position pulse signal to the servo motor, and the encoder transmits the motor rotation information back to the driver to form the position mode full-closed loop control.

The ferry robot (141) controls the system frame chart. The PLC system is the core part to control the movement of the robot (141), including the touch screen (162), the wireless communication module (163), the OMRON® PLC controller (164), the ND module (405), the D/A module (166), etc. The wireless communication module (163) communicates with the touch screen (162) through the serial port RS485. The OMRON PLC controller (164) communicates with the touch screen (162) through the serial port RS232. The touch screen (162) communicates with the background monitoring system (167) through Ethernet. The ultrasonic ranging sensor (168), the DMP sensor (169), the hydraulic proportional flow valve (170), the encoder (171), the proximity switch (172), the photoelectric switch (173) and other parts conduct real time data transmission communication with PLC control system the PLC control system (161). The ultrasonic ranging sensor (168) and the DMP sensor (169) are connected to the A/D module (165) in the PLC control system (161), converting the analog signals collected by sensors into digital signals, and transferring to the PLC control system (161). The hydraulic proportional flow salve (170) is connected to the D/A module (166) in the PLC control system (161), converting the digital signals into analog flow control information to achieve speed control of the hydraulic lifting mechanism (143). The encoder (171) is connected with the ND module (165) of the PLC control system (161), and collects the rising height of the side rack of the second level hydraulic cylinder (154) to calculate the lifting height of the second level hydraulic cylinder (154), and sends the data back to the PLC control system (161), forming full-closed loop control during the lifting process. The proximity switch (172) and the photoelectric switch (173) are connected to the OMRON PLC controller (164) in the PLC control system (161), and conducts real time transmission of the limit position information of each freedom degrees, which triggers the interrupt mode and high-speed counting mode inside the PLC control system (161) and realizes precise and quick movement of the ferry robot (141) within the specified scope.

The contact body (204) is connected with the electrical socket, and the connect plug (207) is connected with the battery pack. The contact (209) is set at the right of the inner contact column (208) of the contact body (204), which is closely against the connect plug (207). Inside the connect plug (204), the spring (212) is set, which limits the position when the connect plug (207) push the contact (209) to the left. The contact body (204) comprises the shell (205) and the lid (206). The lid (206) is arranged on the left of the shell (205). There are through-holes on the right end of the shell (205) and the lid (206). The left end of the column (208) is set inside the trough-hole of the lid (206) in sealed connection, and the contact (209) is set inside the shell (205) in sealed connection as well. The contact baffle (210) is set on the right end of the column (208). The spring (212) covers the column (208) with one side against the contact baffle (210) and the other side against the lid (206). Inside the shell (205), the damping oil (213) is filled in the space between the lid (206) and the contact baffle (210). The contact baffle (210) has the damping hole (211), which connects spaces of the left and right side of the contact baffle (210). There is clearance between the inner surface of the shell (205) and the exterior margin of the contact baffle (210). The positioning screw (214) is set on the surface of the right side of the shell (205), corresponding to the connect plug (207). The positioning hole (215) is set on the surface of the left side of the connect plug (207), corresponding to the shell (205). The first sealing coil (206) is set between the left end of the contact column and the trough-hole of the lid (206). The first sealing coil (216) is also set between the contact (209) and the trough-hole of the shell (205). The diameter's middle part of the damping hole (211) is smaller than its whole diameter. When the connect plug (207) installed on the battery pack moves to the left, the connect plug (207) hold against the contact (209) and compress the spring, making the two surfaces closely contacted to conduct power. The function of the contact (209) is to conduct high voltage from the battery pack to the electric vehicle. When the contact (209) pressed by the connect plug (207) on the battery pack, it shrinks back to the left. The positive pressure increases as the press increases, which make the connect plug (207) and the contact (209) closely connected. When the vehicle shakes or changes speed during driving, the contact (209) tends to move. The non-conductive damping oil (213) is filled in the shell (205). The contact (209) can only be moved to the left after overcoming the damping of the non-conductive damping oil (213). Thus quick move is impossible, but slow move still occurs. The contact 209 can be moved slowly to the left under external force. When the contact (209) moves to the left, the oil pressure at the left side of the contact (209) increases. The oil can only slowly flow to the front though the damping hole (211) set on the contact (209) or the gaps beside edges, which can efficiently avoid power disconnection caused by the quick movement of the contact when the vehicle shakes or changes speed, and avoid damaging to the contact (209) caused by are discharge.

The contact body (204) is connected with the electrical socket, and the connect plug (207) is connected with the battery pack. The contact (209) is set at the right of the inner contact column (208) of the contact body (204), which is closely against the connect plug (207). Inside the connect plug (204), the spring (212) is set, which limits the position when the connect plug (207) push the contact (209) to the left. The contact body (204) comprises the shell (205) and the lid (206). The lid (206) is arranged on the left of the shell (205). There are through-holes on the right end of the shell (205) and the lid (206). The left end of the column (208) is set inside the trough-hole of the lid (206) in sealed connection, and the contact (209) is set inside the shell (205) in sealed connection as well. The contact baffle (210) is set on the right end of the column (208). The spring (212) covers the column (208) with one side against the contact baffle (210) and the other side against the lid (206). Inside the shell (205), the damping oil (213) is filled in the space between the lid (206) and the contact baffle (210). The contact battle (210) has the damping hole (211), which connects spaces of the left and right side of the contact baffle (210). There is clearance between the inner surface of the shell (205) and the exterior margin of the contact baffle (210). The positioning screw (214) is set on the surface of the right side of the shell (205), corresponding to the connect plug (207). The positioning hole (215) is set on the surface of the left side of the connect plug (207), corresponding to the shell (205). The first sealing coil (216) is set between the left end of the contact column and the trough-hole of the lid (206). The first sealing coil (216) is also set between the contact (209) and the trough-hole of the shell (205). The diameter's middle part of the damping hole (211) is smaller than Us whole diameter. When the connect plug (207) installed on the battery pack moves to the left, the connect plug (207) holds against the contact (209) and compress the spring, making the two surfaces closely contacted to conduct power. The function of the contact (209) is to conduct high voltage from the battery pack to the electric vehicle. When the contact (209) is pressed by the connect plug (207) on the battery pack, it shrinks back to the left. The positive pressure increases as the press increases, which make the connect plug (207) and the contact (209) closely connected. When the vehicle shakes or changes speed during driving, the contact (209) tends to move. The non-conductive damping oil (213) is filled in the shell (205). The contact (209) can only be moved to the left after overcoming the damping of the non-conductive damping oil (213). Thus quick move is impossible, but slow move still occurs. The contact (209) can be moved slowly to the left under external force. When the contact (209) moves to the left, the oil pressure at the left side of the contact (209) increases. The oil can only slowly flow to the front though the damping hole (211) set on the contact (209) of the gaps beside edges, which can efficiently avoid power disconnection caused by the quick movement of the contact when the vehicle shakes or changes speed, and avoid damaging to the contact (209) caused by arc discharge.

The first sealing ring (178) of the outer-inner double sealing ring is set inside the first framework (179) of the first electrical plug plate (177). On the plug of the first electrical connector (175), the first sealing ring (178) is set in circle outside the first strong contact (185), the second strong contact (190), the third strong contact (193), the fourth strong contact (198) and the first signal control line contact (186). Inside the socket box (180) of the first battery pack socket base (176), there are the fifth strong damping contact (187), the sixth strong damping contact (189), the seventh strong damping contact (191), the eighth strong damping contact (197), the first signal control line socket box (188), the first socket (192), the second socket (182), the third socket (183), the fourth socket (196) and the first signal control line socket (184). The first socket wire (192) is connected to the seventh strong damping contact (191), the second socket's wire (182) is connected to the fifth strong damping contact (187), the third socket's wire (183) is connected to the sixth strong damping contact (189), the wire of the fourth socket (196) is connected to the eighth strong damping contact (197), the signal line of the first signal control line socket (184) is connected to the first signal control line socket box (188). An elastic part is set on the first signal control line socket box (188). When the first signal control line contact (186) pushes the first signal control tine socket box (188), it makes the first signal control line socket box (188) closely against the first signal control line contact (186) through this elastic part. The first strong contact (185) is connected to the first power line (23), the second strong contact (190) is connected to the second power line (24), the fourth strong contact (198) is connected to the ground wire (30) of the first battery pack 3's first SPD. The first signal control line contact (186) is connected to the first control line and the BMS signal line (20) in the first battery pack (3). The second socket (182) and the third socket (183) is connected to the strong current line of the vehicle 1. The first signal control line socket (184) is connected to the signal control line of the vehicle. One end of the first rubber pad (195) is connected to the socket box (180), the other end is connected to the first battery pack socket base (176). The first screw (194) is set in the first rubber pad (195). The first electrical connector (175) is installed at the front of the first battery pack (3), when the first bracket (108) of the control system (11) pushes the first battery pack (3) to its installing place, the first electrical connector (175) connects with the first battery pack socket base (176) of the first battery pack (3). The third strong contact (193) pushes and closely holds against the seventh strong current damping contact (191). The first strong contact (185) pushes and closely holds against the fifth strong current damping contact (187). The second strong contact (190) pushes and closely holds against the sixth strong current damping contact (189). The fourth strong contact (198) pushes and closely holds against the eighth strong current damping contact (197). The first signal control line's contact (186) is connected to the first signal control line's socket (188). The sealing ring (178) moves along with the first battery pack (3). The two sealing arcs on the sealing ring combine with the flat surface, forming two circular sealing line around the contact after deforming.

The first vent-pipe connector (280) of the first socket is connected to the vent control system of the vehicle (1). The first vent-pipe connector (280) is connected to the first vent-pipe (281) of the first socket. The first vent-pipe (281) is connected to the first vent-pipe damping socket (282). The second vent-pipe connector (283) of the first socket is connected to the second vent-pipe (284). The second vent-pipe (284) is connected to the damping socket (285). The first air inlet port (279) of the first plug is connected to the second air inlet-outlet port. When outside air enters the air passageway (274), it flows to the case of the first battery pack (3) through the first air inlet-outlet port (275) to cool the first battery pack (3), after that the air flows out from the first plug's first outlet port (278). The first plug first outlet port (278) is connected to the damping socket (282). The place between the first air inlet port (279) and the damping socket (285) is hollow that can ventilate. The sealing ring (178) surrounds the first plug's first outlet port (278) and the first air inlet port (279) into a isolated circular sealing structure. Then the sealing ring (178) separates the first plug's first outlet port (278) from the first air inlet port (279) in the middle.

The second connector plug (254) is set at the front of the second battery pack (4). The second socket (262) is installed on the battery pack hanging bracket (220) of the vehicle (1). Inside the second framework (260) on the plug plate (263), there is a second sealing ring (261) with integrated outer ring and inner ring. The second sealing ring (261) is circled around the outside of the ninth strong current contact (253), the tenth strong current contact (255), the eleventh strong current contact (258), the twelfth strong current contact (259) and the second signal control contact (256) on the second connector plug (254). Inside the socket box (249), there is the thirteenth strong damping contact (239), the fourteenth strong damping contact (241), the fifteenth strong damping contact (246), the sixteenth strong damping contact (248) and the second signal control line socket box (244), the fifth socket (240), the sixth socket (242), the seventh socket (245), the eighth socket (248) and the second signal control line socket (244); the wire of the fifth socket (240) is connected to the thirteenth strong damping contact (239), the wire of the fifteenth strong damping contact (246) is connected to the fourteenth strong damping contact (241), the wire of the seventh socket (245) is connected to the fifteenth strong damping contact the fifteenth strong electric damping contact (246), the wire of the eighth socket (247) is connected to the eighth socket (248), the signal line of the second signal control line socket (243) is connected to the second signal control line junction box (244). The tenth strong electric contact (255) is connected to the second power line (42) of the second battery pack (4). The eleventh strong current contact (258) is connected to the forth power line of the second battery pack (4). The ninth strong electric contact (253) is connected to the ground line (47) of the second power's SPD. The twelfth strong current contact (259) is connected to the second signal line protector's ground wire (34) of the second battery pack (4). The sixth socket (242) and the seventh socket (245) are connected to the strong current line of the vehicle (1). The second signal control line socket (243) is connected to the inner signal control line of the vehicle (1). The second elastic parts include the second rubber pad (251) with one end connecting with the socket box (249) and the other end connecting with the second bracket (262), the second screw (250) set inside the second rubber pad (251). When the second signal control line's junction box (244) and the second bracket (262) connects after the second bracket (109) of the robot control system (14) pushes the second battery pack (4) into the installing place, the ninth strong electric contact (253) pushed and closely holds against the thirteenth strong electric damping contact (239), the tenth strong current contact (255) pushed and closely holds against the fourteenth strong damping contact (241), the eleventh strong current contact (258) pushes and closely holds against the fifteenth strong damping contact (246), the twelfth strong current contact (259) pushes and closely holds against the eighth socket (248), the second signal control contact (256) is connected to the second signal control line's junction box (244). Elastic parts are set on the second signal control line socket (244), when the second signal control contact (256) pushes the second signal control line junction box (244), it makes the second signal control line junction box (244) closely holds against the second signal control contact (256). The second sealing ring (261) moves along with the second battery pack (4). It's two sealing arcs combine with the flat surface and changes in form, forming two circular sealing line.

The second socket's first air-vent connector (267) is connected to the air-vent control system of the vehicle (1) and to the second socket's first air-vent (268). The second socket's first air-vent (268) is connected to the second socket's first air-vent damping socket (269). The second socket's second air-vent connector (270) is connected to the second socket's second air-vent (271). The second socket's second air-vent (271) is connected to the second socket's second air-vent damping socket (277). The second plug's first inlet port (271) is connected to the first inlet-outlet port (275). When the air enters the air passageway (274), the air flows to the case of the second battery pack (4) through the second air inlet-outlet port (276) to cool the second battery pack (4), after that the air flows out from the second plug's first outlet port (272). The place between the second socket's first air-vent damping socket (269) and the second plug's first outlet port (272) is hollow that can ventilate. The place between the second socket's second air-vent damping socket (277) and the second plug's first inlet port (273) is also hollow and can ventilate. The sealing ring (261) surrounds the second plug's first outlet port (272) and the second plug's first inlet port (273) into a isolated circular sealing structure. Then the sealing ring (261) separates the second plug's first outlet port (272) from the second plug's first inlet port (273) in the middle.

The beneficial effect of this invention: the first and second battery packs are replaced by the robots of the battery replacement station, which is under the command of the battery pack replacement system controlled by Internet of things on electric vehicle's chassis. And the power surge protectors and the signal line protectors in the first and second battery packs can prevent burning caused by large current attack on the battery pack after having short circuit caused by collision, effectively increasing the electric vehicle's mileage and ensure the electric vehicle's safe driving.

FIGURE ILLUSTRATION

FIG. 1 The local section view of the battery pack automatic replacement system and the explosion-proof system in an electric vehicle.

Figure 2:
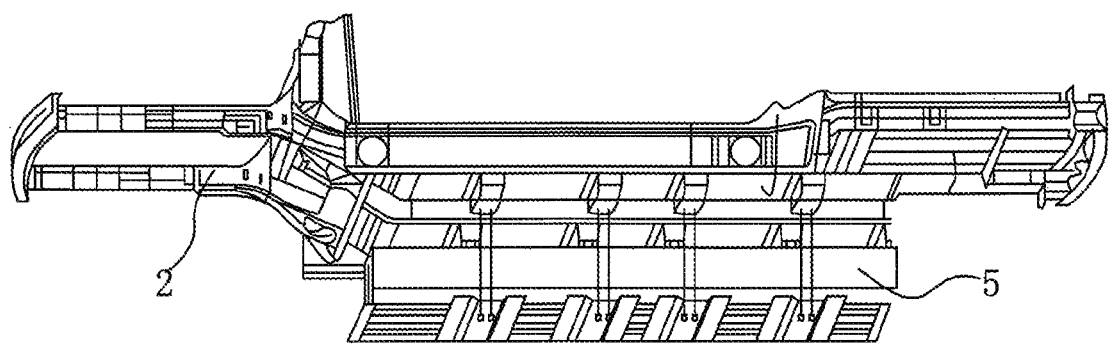

FIG. 2 The stereoscopic diagram of the battery pack automatic replacement system and an explosion proof system on the chassis of electric vehicle.

Figure 3:
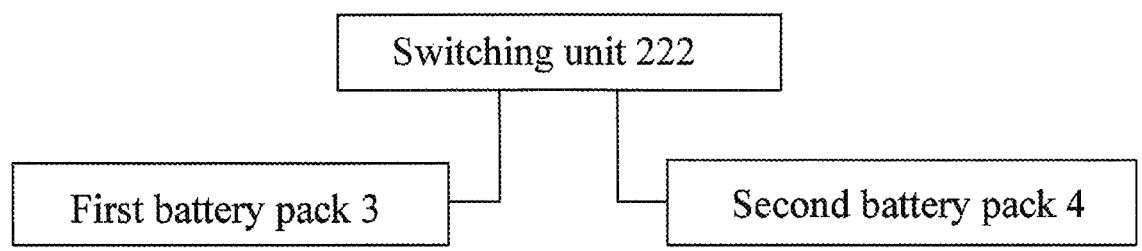

FIG. 3 The schematic diagram of the battery pack automatic replacement system and the explosion-proof system of the invention.

Figure 4:
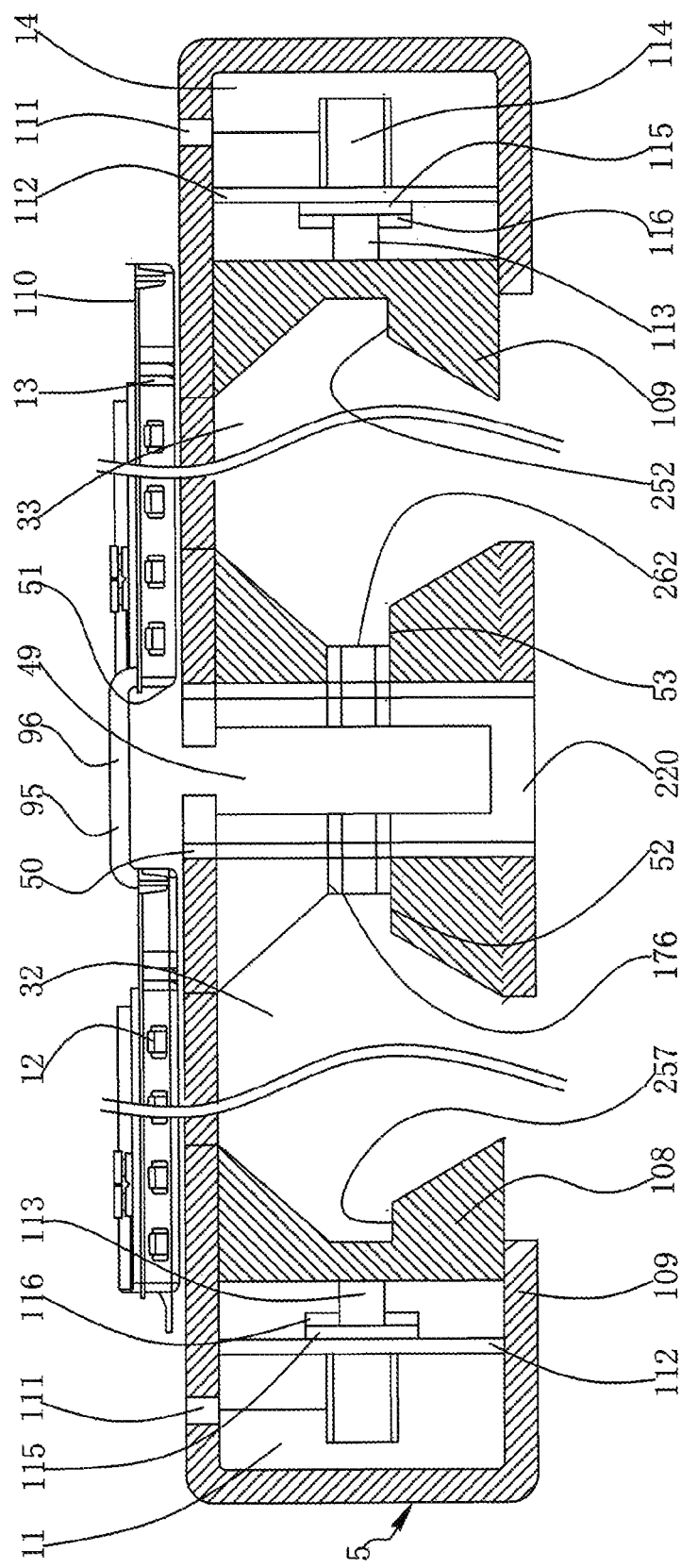

FIG. 4 The sectional view of the battery pack automatic replacement system and the explosion-proof system of the invention.

Figure 5:
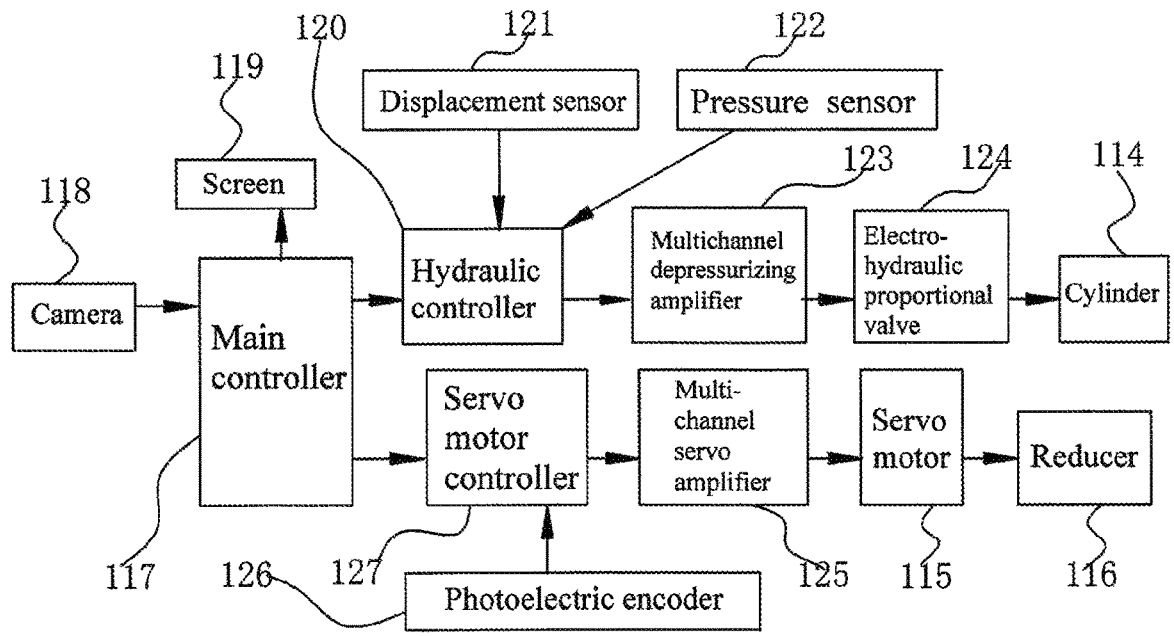
Figure 6:
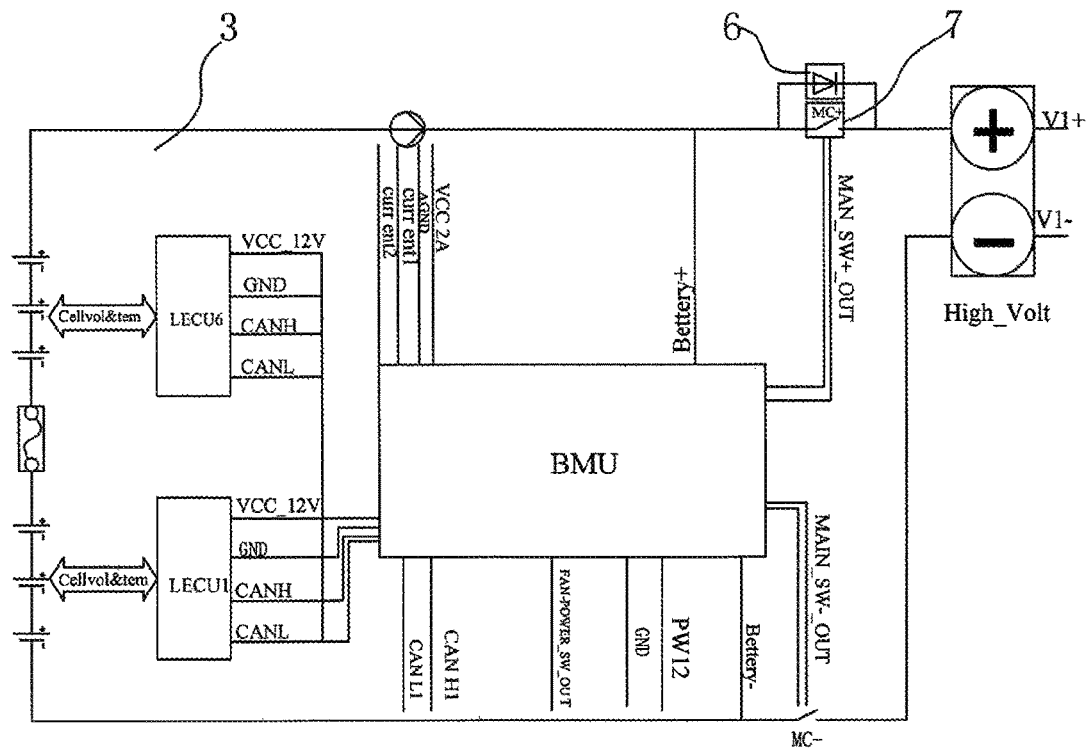
Figure 7:
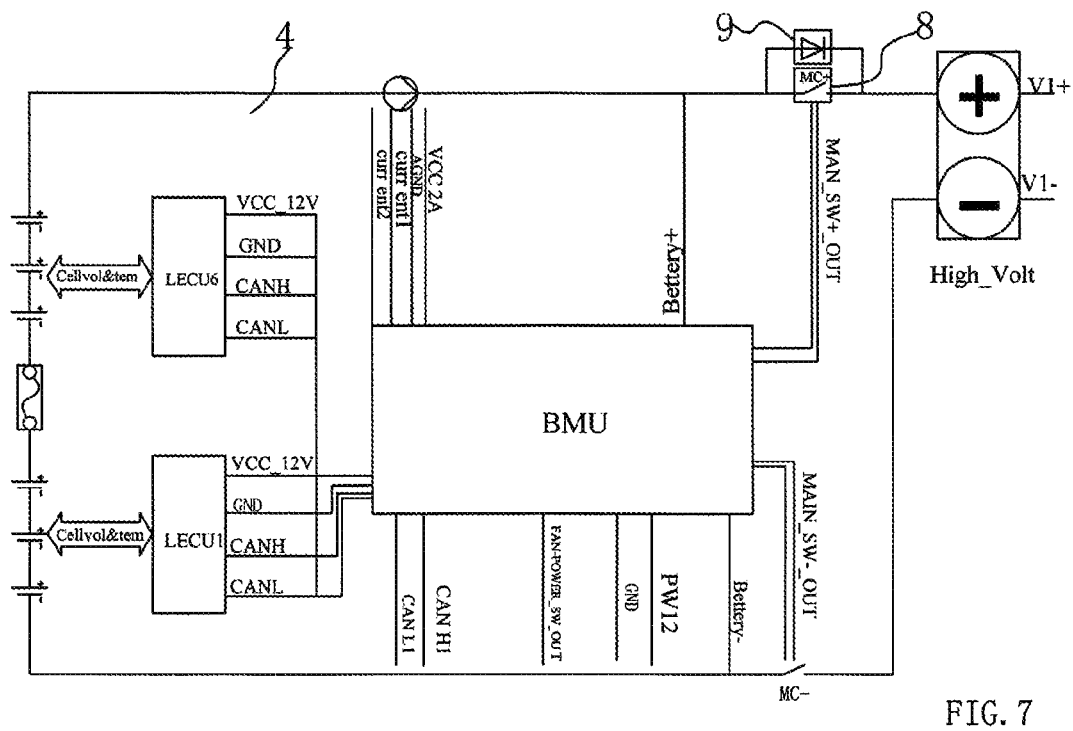
Figure 8:
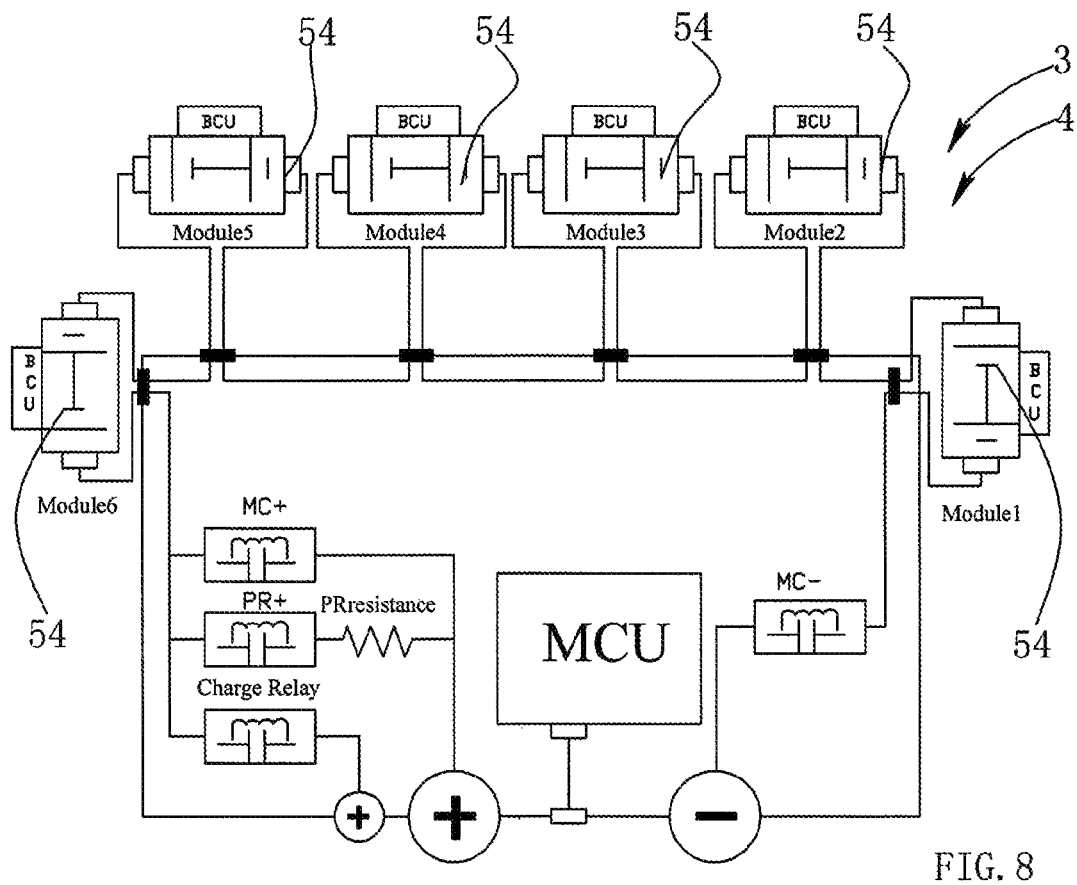
Figure 9:
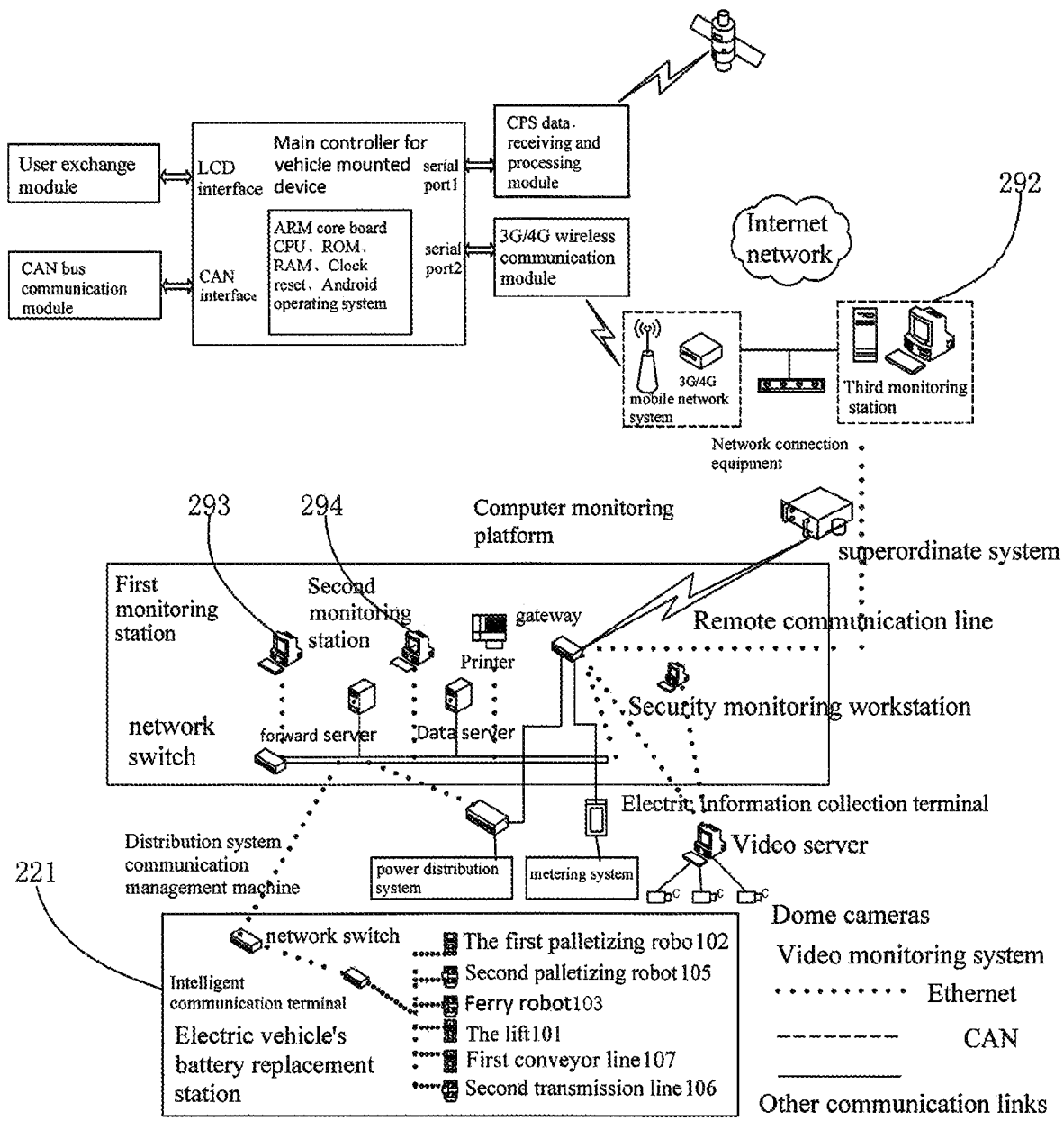

FIG. 5 The block diagram of the invention to control the first battery pack robot system and the second control battery pack robot system;

FIG. 6 The topology diagram of the first battery package of the invention;

FIG. 7 The topology diagram of the second battery package of the invention;

FIG. 8 The structure diagram of the first battery pack and the second battery pack of the invention;

FIG. 9 The network structure diagram of the battery pack replacement system of the electric vehicle based on the Internet of things.

Figure 10:
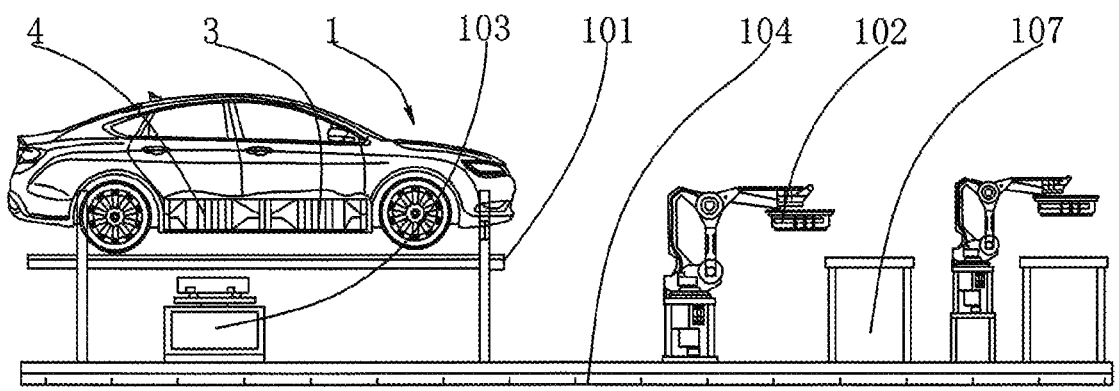

FIG. 10 The local stereo gram of the battery replacement station of the invention.

Figure 11:
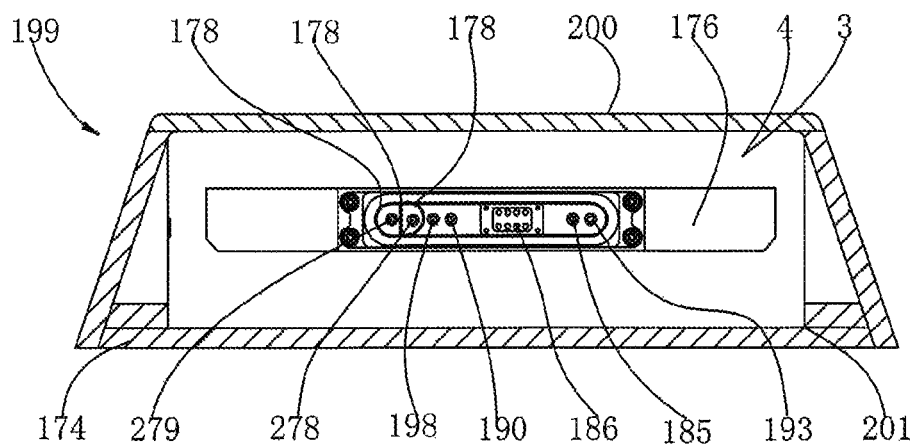
Figure 12:
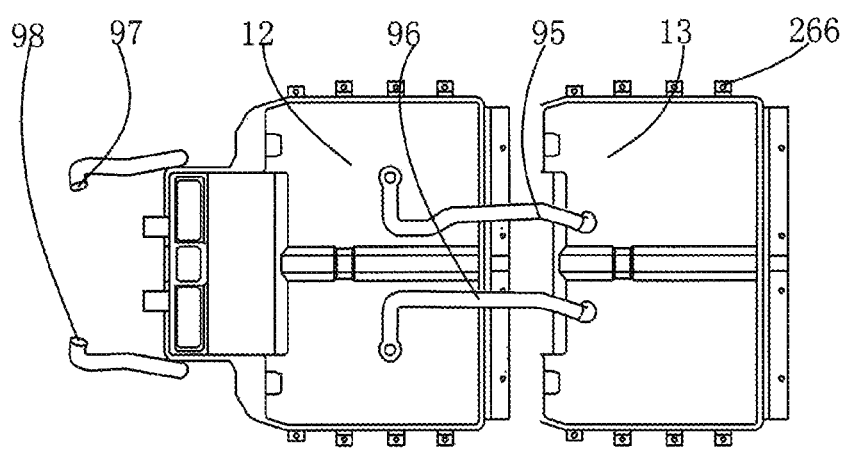

FIG. 11 The positive view of the first battery pack and the second battery pack of the invention;

FIG. 12 The structure diagram of the first temperature adjustment plate and the second temperature adjusting board of the invention.

Figure 13:
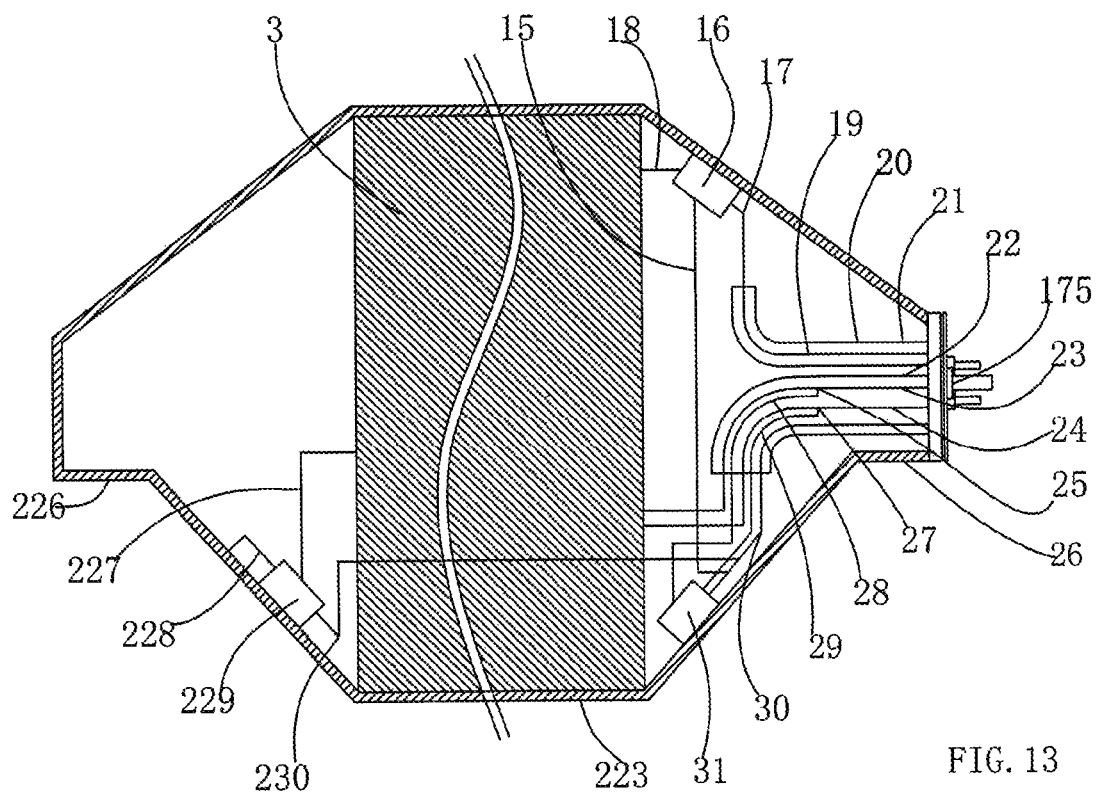
Figure 14:
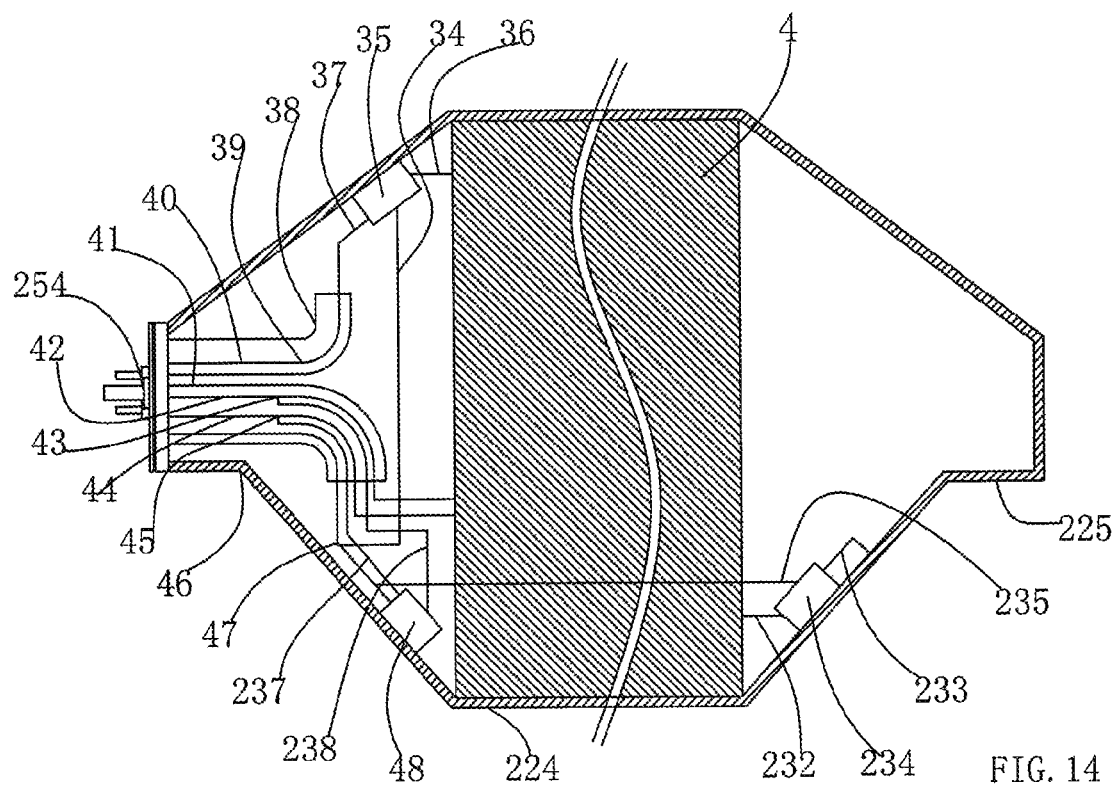
Figure 15:
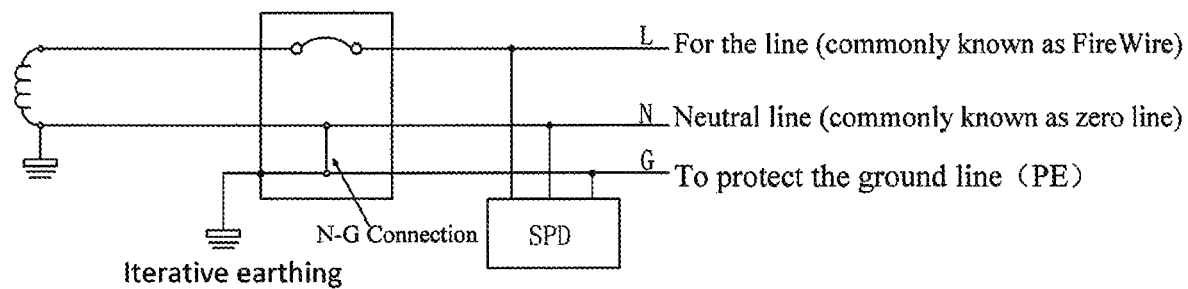

FIG. 13 The section of the first battery pack of the invention;

FIG. 14 The section of the second battery pack of the invention;

FIG. 15 The common connection mode between the power supply line and the power supply line of the power supply surge protector of the invention.

Figure 16:
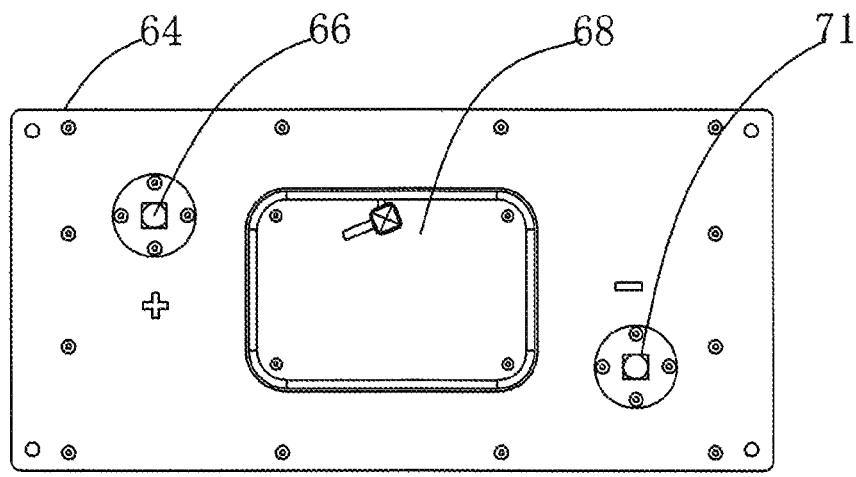
Figure 17:
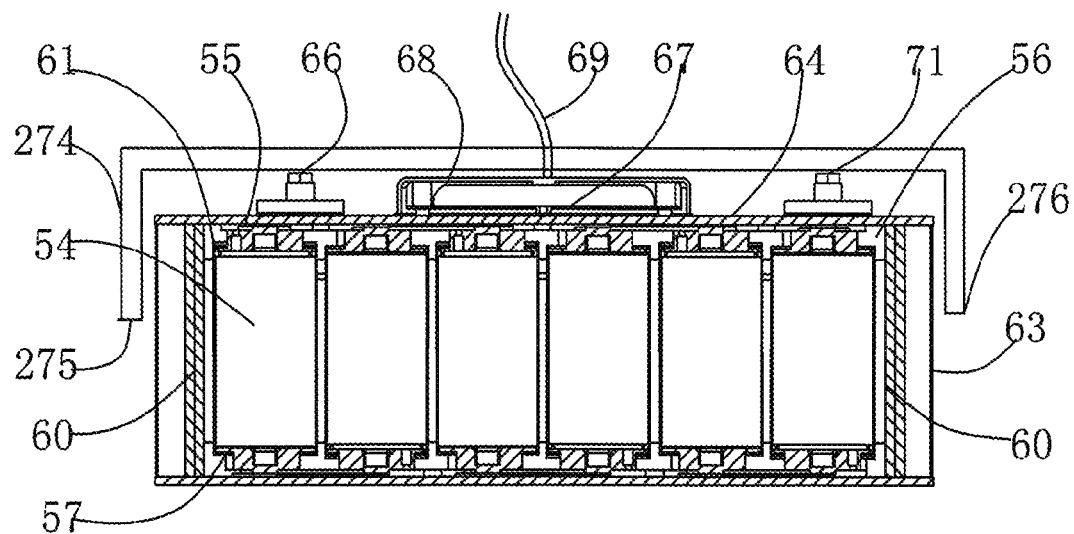

FIG. 16 The overlook chart of the battery package of the invention;

FIG. 17 The A-A profile view of the battery package of the invention;

FIG. 18 The overlook and the local profile structure map of the invention after the battery pack shell is removed;

FIG. 19 The stereo gram of the upper support seat of the invention.

FIG. 20 The stereo gram of the lower support seat of the invention.

Figure 22:
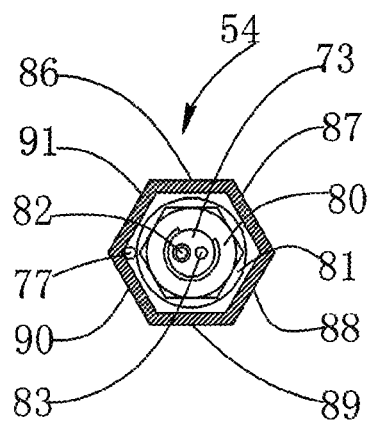
Figure 23:
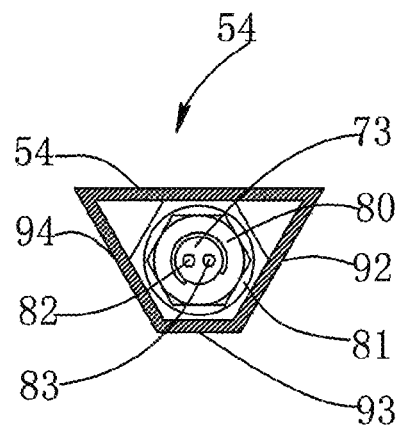
Figure 24:
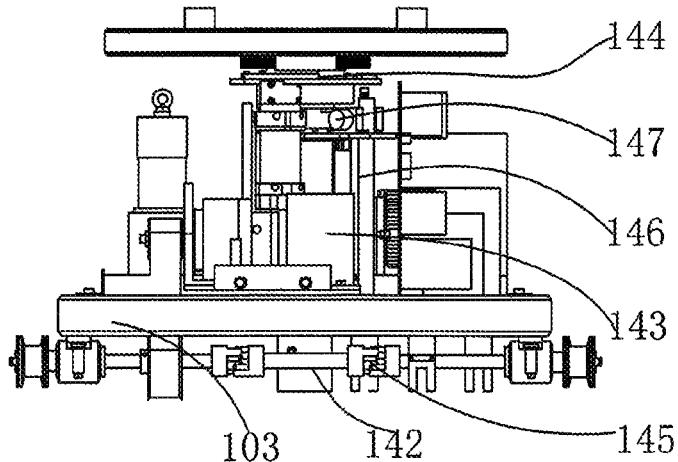

FIG. 21 The profile of the positive six prism cell of the invention;

FIG. 22 The projection of the positive six prism form single cell in the invention;

FIG. 23 The overlook view of the ½ structure of a positive six prism single cell battery in the invention;

FIG. 24 The front structure diagram of the ferry robot of the invention.

Figure 25:
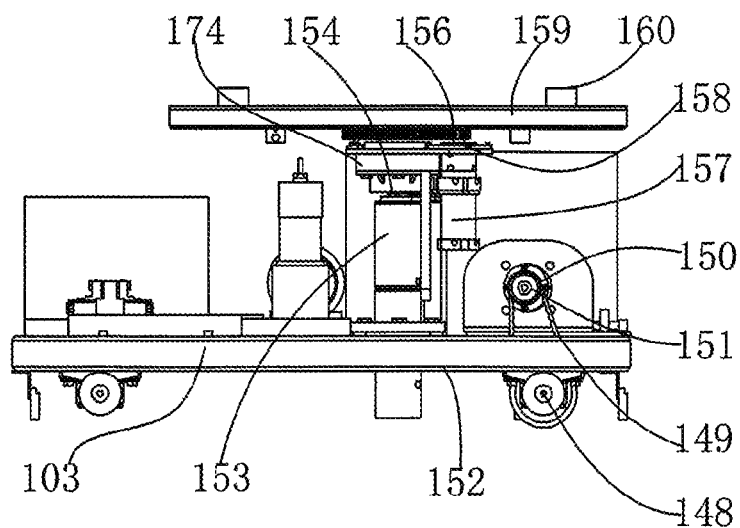

FIG. 25 The side structure diagram of the ferry robot.

Figure 26:
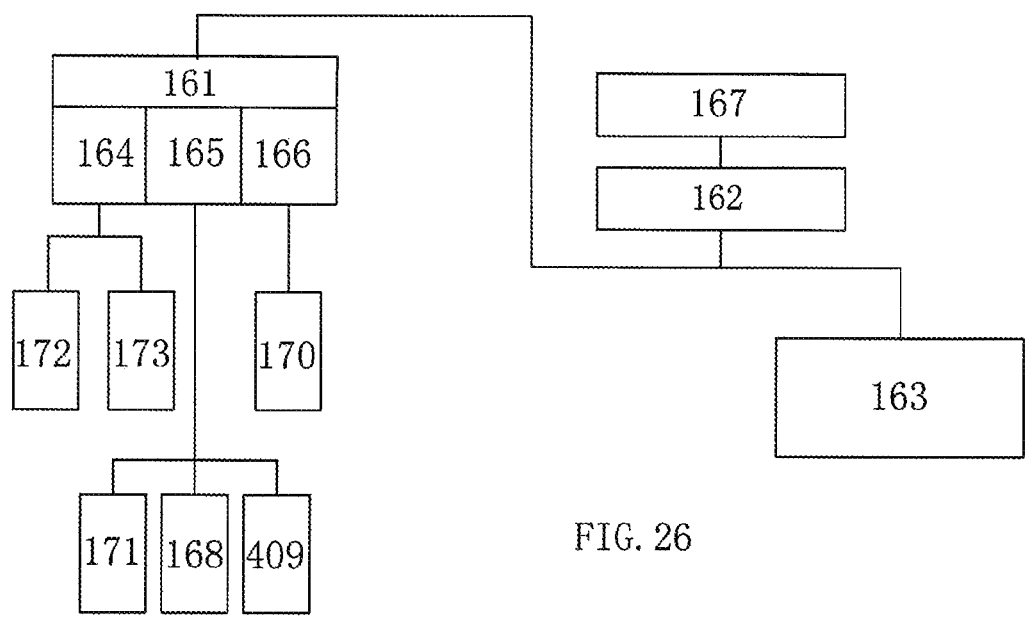

FIG. 26 The block diagram of the control system of a ferry robot.

Figure 27:
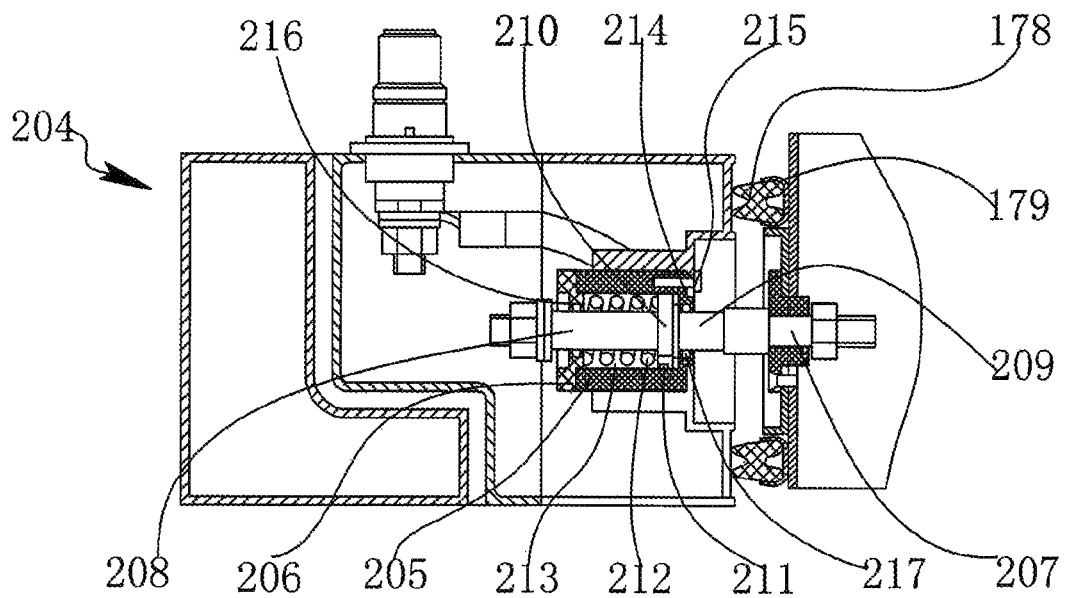

FIG. 27 The structure diagram of the damping contact of the electrical appliance seat of the invention.

Figure 28:
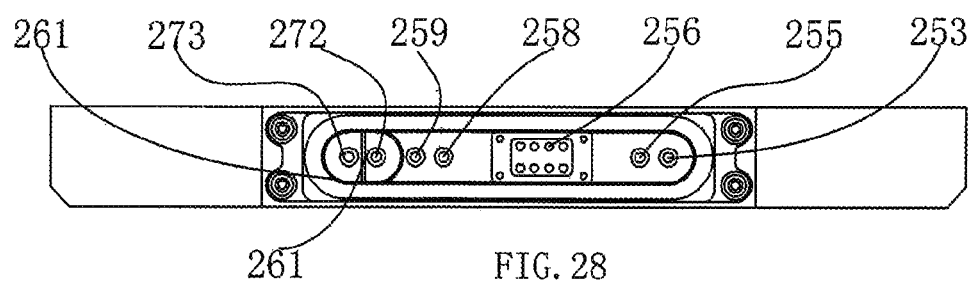
Figure 29:
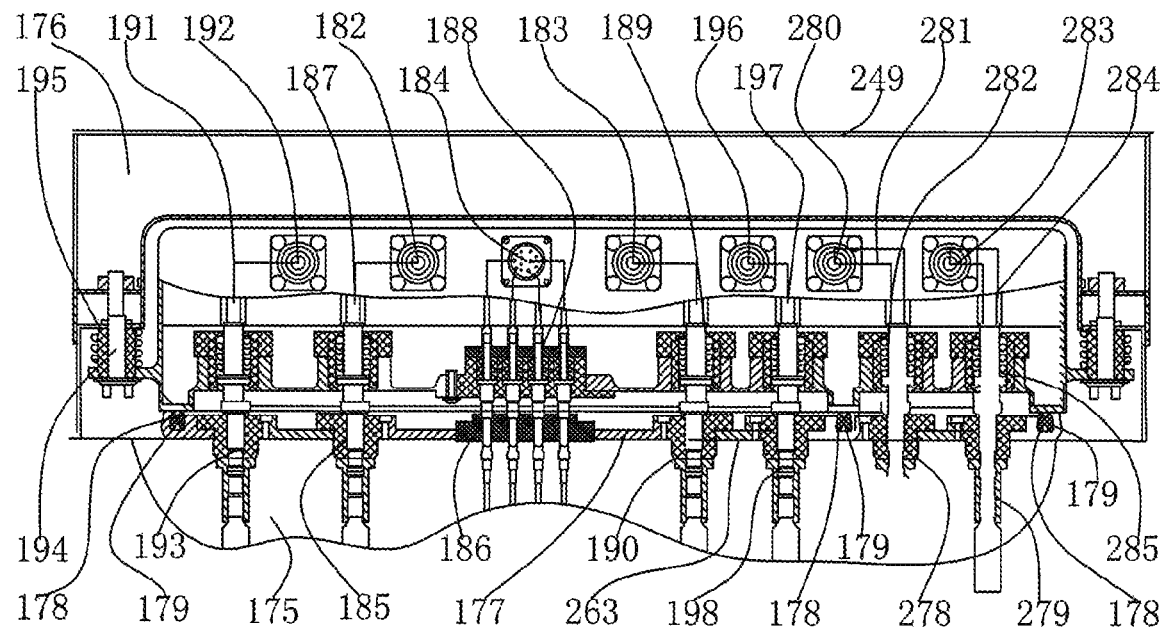

FIG. 28 The positive view of the second electrical plug of the invention;

FIG. 29 The connection diagram of the first electrical connector plug and the first electrical appliance seat of the invention.

Figure 30:
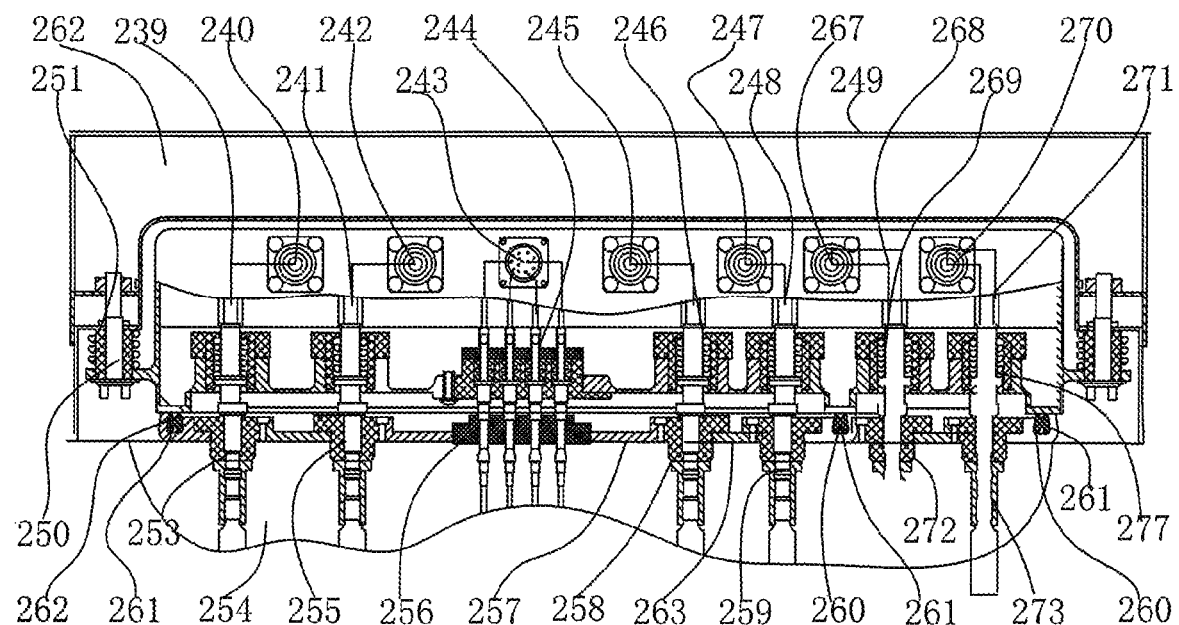

FIG. 30 The connection diagram of the second electrical connector plug and the second electrical connector of the invention.

SPECIFIC IMPLEMENTATION METHODS

In FIG. 1 FIG. 2 and FIG. 4, the automatic battery pack replacement and explosion-proof system (5) on electric vehicle chassis (2) includes one first battery pack spot (32) and one second battery pack spot (33); the first battery pack spot (32) was set at the middle-front part of the electric vehicle chassis (2) while the second battery pack spot (33) was at the middle-back part. When in use, the first battery pack (3) will be placed in the first battery pack spot (32) and the second battery pack (4) will be placed in the second battery pack spot (33), which makes the barycenter of the vehicle to be at its middle part. Set one battery pack bracket wire channel (49) and one first battery pack's electrical connector seat (176) and one second battery pack's electrical connector seat (262) on the battery pack suspension bracket (220), then fix the battery pack suspension bracket (220) under the inner roof of the system (5) with screws through the first fixed port (50) and the second fixed port (51). Install one first battery pack robot control system (11) and one second battery pack robot control system (14) inside the system (5). The vehicle wheel (10) consists of the hub (99) made of metal and the tyre (100) made of conductive rubber, which can transfer current from the ground wire of each part to the ground.

In FIG. 3, FIG. 6, FIG. 7, and FIG. 8, the switching unit (222) consists of the first battery pack (3) and the second battery pack (4), which are both independent power supply set on the electric vehicle (1). The outlet end of the first battery pack (3) is connected to that of the second battery pack (4) in parallel. The first battery pack (3) is the priority power supply while the second battery pack (4) is the backup power supply. The switching unit (222) is configured as following: when the SOC of the first battery pack (3) is less than the predefined threshold value, it will be switched to the second battery pack (4) for power supply. SOC is short for State of Charge, referring to the ratio of charging capacity to rated capacity, represented by percentage. The battery has rated capacity, in a certain rate of charge for a certain time, we can get the charge capacity, and the charge capacity and the rated capacity ratio is SOC, the preset threshold is 5%-8%.

In FIG. 6, on the inner line of the first battery pack's output is the first major relay (7), which is connected to the first diode (6) in parallel.

In FIG. 7 on the inner line of the second battery pack's outlet is the second major relay (8), which is connected to the second diode (9) in parallel. In normal driving, the first battery pack (3) generally supply power, and the first major relay (7) is on and the second major relay is off at this time.

In FIG. 8 and FIG. 17, both the first battery pack (3) and the second battery pack (4) contain several single battery (54) that can be separately disassembled. The first battery pack (3) and the second battery pack (4) contain N (N.g-toreq.1, and is integer) single battery (54) system acquisition board LECU and one master board of battery system BMU. The former mainly collects the voltage and the temperature of single battery (54). The latter mainly collects the current value inspected by the current sensor, which serves as the major reference for SOC calculation. BMU inspects the on and off state of the relay for safety monitoring.

In FIG. 6, FIG. 7, FIG. 8, FIG. 3 and FIG. 4, when drive the electric vehicle (1), the switch unit (222) is configured as: switch off the first major relay (7), and the first battery pack (3) conducts external power supply through the first diode (6); switch on the second major relay (8), and the second battery pack (4) conducts external power supply through the second diode (8); when the voltage of the second battery pack (4) is greater than that of the first battery pack (3), switch off the first unbidirectional conducting diode (6). When stop the electric vehicle (1), the switch unit (222) is configured as: set the low pressure system of the first battery pack (3) into sleep mode by gateway controller. During the restart process of the electric vehicle (1), the low pressure system of the second battery pack (4) is on while that of the first battery pack (3) was off, thus to supply power only by the second battery pack (4).

Operation switch; when the first battery pack (3) needs to be switched to the second battery pack (4), firstly, switch off the first major relay (7) of the first battery pack (3) and conduct external power supply through the first diode (6), of then switch on the second major relay (8) of the second battery pack (4), at this moment, the two battery packs conduct external power supply together. Since the voltage of the second battery pack (4) is larger than that of the first battery pack (3), the first diode (6) will not conduct current from the opposite way and stop voltage output, thus there will be no voltage jump or potential difference between the two battery packs. The gateway controller will make the low pressure system of the first battery pack (3) enter sleep mode and complete smooth switch.

Stop switch: when the SOC of the first battery pack (3) is too low, after stop the car, the low pressure system of (4) enters sleep state by the gateway controller. When restart, only need to start the electrical system of the second battery pack (4) to complete the switch.

Emergency handling: when the temperature of the first battery pack (3) suddenly reaches the warning temperature, such as 150.degree., the first battery pack (3) will be shifted to the second battery pack (4) immediately. If the temperature of the first battery pack (3) keeps rising after surpassing the warning temperature, the robot system (11) that controls the first battery pack (3) will be started at once. Under the drive of the engine, the first bracket (108) under the first link rod (113) will separate itself from the first battery pack (3) together with the first link rod (113). The first bearing platform (257) on the first bucket (108) is gradually separated from the first feed platform (226) of the fast battery pack (3), and the first bracket (108) is separated from the first battery pack (3), which is automatically separated from the vehicle chassis (2) and falls onto the floor. When the temperature of the second battery pack (4) suddenly reaches the warning temperature, such as 150.degree., the second battery pack (4) will be shifted to the first battery pack (3) immediately. If the temperature of the second battery pack (4) keeps rising after surpassing the warning temperature, the robot system (14) that controls the second battery pack (4) will be started at once. Under the drive of the engine the second bracket (109) under the first link rod (113) will separate itself from the second battery pack (4) together with the first link rod (113). The second bearing platform (252) on the second bracket (109) is gradually separated from the second fixed Platform (225) of the second battery pack (4), and the second bracket (109) separates from the second battery pack (4), which automatically separates from the vehicle chassis (2) and falls onto the floor. If both the first battery pack (3) and the second battery pack (4) both reach 150.degree. with the temperature keeping rising, the first robot system (11) and the second robot system (14) can be started at the same time to respectively get rid of the first battery the first battery pack (3) and the second battery pack (4).

In FIG. 9, FIG. 10, FIG. 3, FIG. 4, FIG. 5, FIG. 6, and FIG. 7, both the hydraulic controller (120) and the servo motor controller (127) are connected to the master controller (117) in the first battery pack robot control system (11) and the robot system (14). The hydraulic controller (120) is connected with the multichannel decompression amplifier (123), which is connected with electro-hydraulic proportional valve (124) that is used to drive the up-down moving cylinder (114) of the first link rod (113). The servo motor controller (127) is connected with the multichannel servo amplifier (125), which is connected to the servo motor (115) used to drive the first link rod (113). The servo motor (115) is connected to the first link rod (113) through the reducer (116). The hydraulic controller (120) is also connected with the displacement sensor (121) used to inspect the moving distance of the first link rod (113) and the pressure sensor (122) used to inspect the internal hydraulic oil pressure of the cylinder (114). The servo motor control (127) is also connected with the photoelectric encoder (126) for detecting the revolution speed of the power output shaft of the reducer (116). The master controller (117) is also connected with the camera (118) used for recording robot hand movement and the display screen (119) used to display robot hand movement. The hydraulic controller (120) and the servo motor controller (127) communicate with the master controller (117) through the CAN bus. The master controller (117) receives the remote terminal's instruction via the RS232 data line and distribute missions to the hydraulic controller (120) and the servo motor controller (127) to control the robot hand for series of movements by CAN bus. The output of the hydraulic controller (120) is connected to the multi-channel decompression amplifier (123), and is controls the cylinder (114) through electro-hydraulic proportional valve (124). The output end of the servo motor controller (127) is connected to the multichannel servo amplifier (125), which is connected to the servo motor (115) to control the reducer (116) through the servo motor (115). The environment is collected by the camera (118), and the operation process of the robot hand is displayed on the display screen (119). The displacement sensor (121) is arranged on the robot hand to avoid collision with the external environment.

Steps of replacing the battery pack (3) and the battery pack (4) under the battery pack replacement and explosion-proof system controlled by Internet of things or electric vehicle's chassis:

Step 1: The driver of the vehicle (1) contacts the third monitoring station (292) using the vehicle mounted device though 3G/4G and other wireless network, and find out the nearest battery replacement station (221) for electric vehicles. When arrive the nearest battery replacement station (221), drive the vehicle (1) to the four-column car lifting machine (101), and start the remote battery replacement monitoring mode controlled by the third monitoring station (292) on the LCD screen of the vehicle mounted device.

Step 2: The operator of station (292) hands over the battery replacement procedure to the first monitoring station (293) through network, and the first monitoring station (293) starts remote monitoring. The vehicle battery replacement network enters working state from the waiting state The ferry robot (103) walks to the first battery pack spot (32) under the battery automatic replacement system (5) of the vehicle 1 along the steel rail (104). The battery pack tray (159) holds against the first battery pack (3), and the operator of the first monitoring station (293) starts the first battery pack robot control system (11). Drove by the motor device, the first bracket (108) installed under the link rod (113) starts to be separated from the first battery pack (3). The first bearing platform (257) on the first bracket (108) gradually separated from the first fixed platform (226) of the first battery pack (3), and then the bracket (108) is separated from the first battery pack (3). The ferry robot (103) drives the first battery pack (3) away from the first bearing platform (52), and the first battery pack robot control system (11) stops work. The ferry robot (103) carrying the first battery pack (3) walks to the battery unload place of the first stack robot (102) along the steel rail (104). Then the stack robot (102) unloads the first battery pack (3).

Step 3: The first stack robot (102) grabs the charged first battery pack (3) and put it onto the battery tray (159) on the top of the ferry robot (103).

Step 4: The ferry robot (103) walks to the four-column car lifting machine (101) along the rail (104). After the X/Y direction positioning of the ferry robot (103), the listing process of the robot is calculated by the difference between the output of the ultrasonic ranging sensor and the output of the hydraulic mechanism encoder, which serves as the input of the PID controller to control the proportional flow valve. The positioning is considered as precise when the hydraulic mechanism is lifted to the preset position. When the first monitoring station (293) sends the order of installing the first battery pack (3) to the ferry robot (103), the ferry robot will hold against the first battery pack (3) to the first battery pack spot (32) on the battery pack automatic replacement system (5). The operator of the first monitoring station (293) starts the first battery pack robot control system (11) to push the first battery pack (3) and make the first fixed platform (26) of the first battery pack (3) enter the battery bracket first bearing platform (52). When the first connector plug (175)

is closely linked to the first battery pack socket (176), the installation of the first battery pack (3) is completed, and the first battery pack robot control system 11 stops work. Then the ferry robot (103) leaves the car lifting machine (101) along the rail (104).

Step 5: The ferry robot (103) walks to the four-column car lifting machine (101) along the rail (104), and reaches the second battery pack spot (33) of the second battery pack (4) under the vehicle chassis (2). The battery tray (159) hold against the second battery pack (4), and the operator of the first monitoring station (293) starts the second battery pack robot control system (14). Drove by the motor device, the second bracket (109) installed under link rod (113) starts to be separated from (113). The second bearing platform (252) on the second bracket (109) gradually separates from the second fixed platform (225) of the second battery pack (4), and the second bracket (109) is separated from the second battery pack (4), then the robot system (14) stops work. The second battery pack (4) falls onto the battery tray (159) on the top of the ferry robot (103). The ferry robot (103) carrying the second battery pack (4) walks to the battery unload place of the first stack robot (102) along the steel rail (104). Then the stack robot (102) unloads the second battery pack (4).

Step 6: The first stack robot (102) grabs the charged the second battery pack (4) and put it onto the battery tray (159) on the top of the ferry robot (103).

Step 7: The ferry robot (103) walks to the four-column car lifting machine (101) along the rail (104). After the X/Y direction positioning of the ferry robot (103), the listing process of the robot is calculated by the difference between the output of the ultrasonic ranging sensor and the output of the hydraulic mechanism encoder, which serves as the input of the PID controller to control the proportional flow valve. The positioning is considered as precise when the hydraulic mechanism since lifted to the preset position. When the first monitoring station (293) sends installing order to the ferry robot (103), the ferry robot (103) will hold against the second battery pack (4) to the second battery pack spot (33) under the chassis (2) and the tray (159) pushes the second battery pack (4) to the second battery pack spot (33). The operator of station (293) starts the control system (14) to push the second battery pack (4) and make the first fixed platform (46) of the second battery pack (4) enter the battery bracket second bearing platform (53). The second connector plug (254) is closely linked to the second battery pack socket (262). When the installation of the second battery pack (4) is completed, the second battery pack robot control system (14) stops work, and the ferry robot (103) leaves the car lifting machine (101) along the rail (104).

Step 8: When the battery replacement process is completed, the car lifting machine (101) descends, and the driver of the vehicle (1) drives away from the replacement station.

Step 9: The first monitoring station (293) sends the signal of completing the battery replacement, then the entire battery replacement station (221) returns to the original spot.

In FIG. 11, the first battery pack's case (223) and the second battery pack's case (224) both are made of the battery pack's case (199), which contains the upper lid (200) and the base (201). The front side of the base (91) has a setting-in connector plug (203), which can be constructed as the first connector plug (175) or the second connector plug (254). The upper lid (200) of the case (199) shorter than the trapezoidal frame of bottom margin (174) on the base (201).

In FIG. 12, install the first temperature adjustment panel (12) and the second temperature adjustment panel (13) on the battery replacement system (5) with several fixing port (266). The panel (12) is installed over the first battery pack spot (32) while the panel (13) is installed over the second battery pack spot (33). The first connecting tube (95) and the second connecting tube (96) link the panel (12) and the panel (13) together, and the coolant inlet (97) and the coolant outlet (98) are set on the panel (12).

In FIGS. 13 and 17, the first battery pack (3) is put into the first battery case (223), and one first shielding wire 21 bent to 90.degree. and the second shielding conduit (22) bent into 90.degree. (both are made of magnetic and electronic conductive metal) are fixed inside the first battery pack's case (223), in which the first signal line protector (16) is also installed. The first control line and the BMS signal line (20) enter the inner front of the first battery pack's case (223) along the first shielding conduit (21) and connect to the first connecting spot (19) with the first conduit (17) of the first signal line protector (16). The first signal line protector's second wire 18 is connected with the PCB signal outlet line (69) of the first battery pack (3). The first control line, the BMS signal line (20) and the first signal line protector 16 are in series connection. The first connection spot (19) unloads and absorbs current flowing along the first control line and the BMS signal line (20). The first signal line protector's ground line (15) is connected to the first power surge protective devices (SPD) ground line (30). Install the first power's SPD (31) inside the first battery pack's case (223). the first power line (23) enters into the first battery pack's case (223) along the second shielding conduit (22) find is connected at the second connecting spot (25) with the first conduit (28) of the first power SPD. The first power line (23) is connected to the positive terminal (66) of the first battery pack (3). The second power line (24) enters into the first battery pack's case (223) along the second shielding conduct (22) and is connected at the second connecting spot (27) with the second conduit (27) of the first power SPD. The second power line (24) is connected to the negative terminal (71) of the first battery pack (3). The ground line (30) of the first power's SPD is connected to the forth electrical contact (198) of the plug (176). The second connecting spot (25) unloads and absorbs the current flowing along the first power line (23). The third connecting spot (27) unloads and absorbs current flowing along the second power line (24). Install the second power SPD (229) inside the first battery pack's case (223). The first conduit (227) of the third power's SPD is connected to the outer surface of the first battery pack (3). The second conduit (228) of the third power's SPD is connected to the inner surface of the first battery pack's case (223), which can unload and absorb the current induced from the first battery pack's case (223). The ground line (230) of the third power' SPD is connected to the first power surge protector's ground line (30). The first signal line protector's ground line (15), the first power surge protector's ground line (30) and the ground line (230) of the third power's SPD are in equipotential connection. Conduct the current from the above three lines to the ground line forth electrical contact (198), then to the ground system of the vehicle (1), finally to the earth through the wheel.

In FIG. 14 and FIG. 17, put the second battery pack (4) into the second battery pack case (224), one third shielding wire 38 bent to 90.degree. and one forth shielding conduit (41) bent to 90.degree. (both are made of magnetic and electronic conductive metal) are fixed inside the second battery pack's case (224), in which the second signal line protector (35) is also installed. The second control line and the BMS signal line (40) enter the inner front of the second battery pack's case (224) along the third shielding conduit (38) and is connected to the forth connecting spot (39) with the second signal line protector's second wire (37). The first conduit (36) of the second signal line protector (35) is connected with the signal outlet line (69) of the first battery pack (3). The first control line, the BMS signal line (20) and the second signal line's protector (35) are in series connection. The forth connection spot (39) unloads and absorbs current flowing along the second control line and the BMS signal line (40). The second signal line protector's ground wire (34) is connected to the ground line (47) of the second power's. Put the second battery pack (4) into the second battery pack's case (224), the third shielding conduit (38) bent into 90.degree. and the forth shielding conduit (41) bent into 90.degree. are made of magnetic and electronic conductive metal are fixed inside the second battery pack's case (224). Install the third power's surge protector (48) inside the second battery pack's case (224), the third power line (42) enters into the second battery pack's case (224) along the forth shielding conduit (41) and connects to the fifth connecting spot (43) with the second wire (238) of the second power SPD. The third power line (42) is connected to the positive terminal (66) of the second battery pack (4). The forth power line (44) enters into the second battery pack's case (224) along the forth shielding conduit (41) and is connected to the sixth connecting spot (45) with the second power surge protector's first wire (237). The forth power line (29) is connected to the negative terminal (71) of the second battery pack (4). The ground line (47) of the second power's SPD is connected to the ninth electrical contact (253) of the second plug (254). The fifth connecting spot (43) unloads and absorbs the current flowing along the third power line (42). The sixth connecting spot (45) unloads and absorbs current flowing along the forth power line (44). Install the forth power's SPD (234) inside the second battery pack's case (224). The first conduit (232) of the forth power's is connected to the outer surface of the second battery pack (4). The second wire (233) of the forth power's is connected to the inner surface of the second battery pack's case (224), the ground line (235) of the forth power's is connected to the ground line (47) of the second power's the ground line (47) of the second power's, the ground line (235) of the forth power's SPD and the second signal line protector's ground wire (34) are in equipotential connection. Conduct the current from the above three lines to the ground line ninth electrical contact, then to ground system of the vehicle (1), final to the earth through the wheel (10).

The SPD is usually connected to the power line in parallel in the circuit.

In FIG. 16, FIG. 17, and FIG. 21 the battery pack shell (63) consists of the frame, the upper lid (64) and the lower lid (65). The positive terminal (66) and the negative terminal (71) are set on the upper lid (64). The current board (67) is connected to each battery through wires. On the circuit board, the signal output line (69) is set on it. Inside the battery pack shell (63), there are the single battery (54) with several positive and negative terminals set on both sides, and the battery array consists of adjacent batteries with opposite polarity in combination permutation. The positive and negative electrodes of the adjacent batteries are connected through the connection strap (55). On the top surface and bottom surface of the battery array, the upper support seat (56) and the lower support seat (57) are respectively set, and they are connected through several support column (60). The circuit board protection cover (68) is set on the board (67), and the signal output line (69) is out from the circuit board protection cover (68). The connecting line of the positive terminal (73) and the negative terminal (7S) in the single battery (54) both form 90.degree. angles with the extended line of the top lid (64) and the extended line of the bottom lid (65).

In FIG. 18, FIG. 19, and FIG. 20, the battery cells (84) is arranged as a regular hexagon, and the battery cells (85) is arranged as half regular hexagon. The two arrangement methods make two kinds of the battery monomer (54). The elastic cushion (61) is set between the bottom surface of the groove (58) of the top support seat (56) and the bottom support seat (57) and the two sides of the battery. The elastic cushion (61) is in circular shape, and it is made of EPDM material. Insulated and heat conductive tape (62) are stuck on the connecting straps. The groove (58) are install on the top support seat (56) and the bottom support seat (57) to put battery in. The intercommunicating pore (59) that can expose battery electrodes are set in the mutually connected battery indentations.

In FIG. 21 and FIG. 22, the lithium battery is positive six prismatic. The first edge (86), the second edge (87), the third edge (88), the forth edge (89), the fifth edge (90) and the sixth edge (91) of the single battery are same in length, which includes the electric core (70), the inner shell (83), the outer shell (72), the positive pole (73) and the negative pole (75). The inner shell (83) covers the electric core (70), the outer shell (72) covers the inner shell (83), the positive pole (73) and the negative pole (75) are respectively at the middle of the upper side surface and lower side surface of the outer shell (72). The cover plate (76) is set on the upper side surface of the outer shell (72), on which there is the first glue injection port (77). The second glue injection port (78) is set at the corresponding place of the lower side surface of the outer shell (72) and the first glue injection port (77). Between the inner shell (83) and the outer shell (72), the high thermal-conductive electronic silica gel (79) is filled. Both the positive pole (73) and the negative pole (75) are screwed with the matching nut (80). The pad (81) is set between the contact surface of the nut (80) and the outer shell (72). At the middle of the positive pole (73), the liquid injection port (82) is set, beside which there is the air-vent (74). With high thermal conductive electronic silica gel (79) filled between the outer shell and the inner shell, the heat diffusion of the electric core (70) becomes more even, and can quickly conduct heat to the outer shell (72) and efficiently improve the seismic capacity and tightness of the lithium battery. The pad (81) is used to fix the electric core (70) and insulate the outer shell (72), which improves electrical insulation and stability. The liquid injection port (82) and the air-vent (74) have the functions of injecting liquid and reducing pressure for the electrolyte of lithium battery.

In FIG. 23 and FIG. 21, the battery is in ½ regular prism structure. The seventh edge (92), the eighth edge (93) and the ninth edge (94) of the single battery are same in length.

In FIG. 24 and FIG. 25, the ferry robot (141) has X axis, Z axis, R axis, three degrees of freedom, respectively being the linear walking mechanism (142), the hydraulic lifting mechanism (143) and the angle deviation mechanism (144). The linear walking mechanism (142) is at the bottom of the ferry robot (141), containing the pulley (148), the universal shaft 145, the belt (149), the first servo motor (150), the first reducer (150) and the base (152); the two pulleys in front are the motor device of the robot, connected to a set of universal shaft. The two pulleys at the back are slave drive device. The firth servo motor (150) and the matching first reducer (151) are in expanding sleeve connection. Motor transfer between the first reducer (151) and the pulley (148) is completed through the belt (149). The pulley (148) does linear walking on the sliding rail. Under the linear walking mechanism (301), there is three photoelectric switches, which respectively cooperates with the origin baffle and the front and rear limit baffles, providing in-place switch signal for the PLC control system (161) to realize robot original spot searching and resetting and avoid cross-border operation. The front limit baffle, the origin baffle and the rear limit baffle are arrayed in order along the linear sliding rail, and the origin baffle is set between the front limit baffle and rear limit baffle. The hydraulic lifting mechanism (143) is above the base of the linear walking mechanism (142), containing two hydraulic telescopic cylinders. The first level hydraulic cylinder (153) is under the second level hydraulic cylinder (154). When the first level hydraulic cylinder (153) fully extends, the second level hydraulic cylinder (154) begins to stretch. At one side of the first level hydraulic cylinder (153) and the second level hydraulic cylinder (154) is respectively soldered crossbeams and a no-rotating beams, which cooperate with the two anti-rotating holes on the soldering beam of the first level hydraulic cylinder (153) and the soldering beam of the base to avoid rotating during the process of battery lifting along with the hydraulic lifting mechanism (143). At the other side of the first level hydraulic cylinder (153) and the second level hydraulic cylinder (154), the rack 146, the encoder (147), the baffle and the first proximity switch. The baffle and the first proximity switch cooperates with each other. The first proximity switch is set at the bottom of the beam of the first level hydraulic cylinder (153), when the first level hydraulic cylinder (153) fully extends, the baffle triggers the switch signal of the proximity switch and the second level hydraulic cylinder (154) starts stretching. The rack (146) on the side of the second level hydraulic cylinder (154) joggles with the encoder (147) through gear The lifting height of the second level hydraulic cylinder (154) is got by calculating the revolution of the encoder (147). The encoder (147) is connected with the PLC control system (161), which starts high speed counting. The angle deviation mechanism 144 is at the top of the hydraulic lifting mechanism (143), containing the mourning flange (155), the gear (156), the second servo motor (157) and the second reducer (158). The flange (155) is installed on the second level hydraulic cylinder (154), and the second servo motor (157), the second reducer (158) and the gear (156) are fixed on the flange (155). The small gear is installed on the second servo motor (157), while the large gear is installed on the second level hydraulic cylinder (154). The small gear and the huge gear are joggled together and rotate along with the second servo motor (157). Under the large gear, the baffle is set here, and there are three second proximity switches on the mounting flange (155). During rotating, the large gear triggers the signals of the left rotation limit, the right rotation limit and the galvanic reset switch to ensure the large gear rotate within the predetermined range. The battery tray (159) is installed on the angle deviation mechanism (144). The rotation center of the large gear and the gravity center of the battery tray (159) is the same one. Four stop blocks (160) are installed on the battery tray (159), and respectively couples with the four break-outs under the bottom of the battery box of the vehicle (1), which can realize slight adjustment and reliable fixing of the battery out box position. The ultrasonic ranging sensor (168) and the DMP sensor (169) are set on the battery tray (159). The ultrasonic ranging sensor (168) is used to measure the distance between the battery tray (312) and the vehicle chassis. The DMP sensor cooperates with the reflecting panel on the vehicle chassis to calculate the target spot of the reflecting panel and gain the horizontal angle deviation of the ferry robot (141) and the vehicle. The linear walking mechanism (142) and the hydraulic lifting mechanism (143) are in linkage. The angle correction mechanism (144) only starts working when the robot (141) linearly walks and vertically lifts to the preset position. The hydraulic lifting mechanism (143) only restarts working when the battery tray (159) on the angle correction mechanism (144) meets the expected effect. The linear walking mechanism (142) and the angle correction mechanism (144) adopts servo motor drive. The drive motor is connected with the corresponding encoder, and each encoder is connected with the corresponding driver. The driver sends position pulse signal to the servo motor, and the encoder transmits the motor rotation information back to the driver to form the position mode full-closed loop control.

In FIG. 26, the ferry robot (141) controls the system frame chart. The PLC system is the core part to control the movement of the robot (141), including the touch screen (162), the wireless communication module (163), the OMRON PLC controller (164), the ND module (405), the D/A module (166), etc. The wireless communication module (163) communicates with the touch screen (162) through the serial port RS485. The OMRON PLC controller (164) communicates with the touch screen (162) through the serial port RS232. The touch screen (162) communicates with the background monitoring system (167) through Ethernet. The ultrasonic ranging sensor (168), the DMP sensor (169), the hydraulic proportional flow valve (170), the encoder (171), the proximity switch (172), the photoelectric switch (173) and other parts conduct real time data transmission communication with PLC control system the PLC control system (161). The ultrasonic ranging sensor (168) and the DMP sensor (169) are connected to the A/D module (165) in the PLC control system (161), converting the analog signals collected by sensors into digital signals, and transferring to the PLC control system (161). The hydraulic proportional flow valve (170) is connected to the D/A module (166) in the PLC control system (161), converting the digital signals into analog flow control information to achieve speed control of the hydraulic lifting mechanism (143). The encoder (171) is connected with the ND module (165) of the PLC control system (161), and collects the rising height of the side rack of the second level hydraulic cylinder (154) to calculate the lifting height of the second level hydraulic cylinder (154), and sends the data back to the PLC control system (161), forming full-closed loop control during the lifting process. The proximity switch (172) and the photoelectric switch (173) are connected to the OMRON PLC controller (164) in the PLC control system (161), and conducts real time transmission of the limit position information of each freedom degrees, which triggers the interrupt mode and high-speed counting mode inside the PLC control system (161) and realizes precise and quick movement of the ferry robot (141) within the specified scope.

In FIG. 27, the contact body (204) is connected with the electrical socket, and the connect plug (207) is connected with the battery pack. The contact (209) is set at the right of the inner contact column (208) of the contact body (204), which is closely against the connect plug (207). Inside the connect plug (204), the spring (212) is set, which limits the position when the connect plug (207) push the contact (209) to the left. The contact body (204) compares the shell (205) and the lid (206). The lid (206) is arranged on the left of the shell (205). There are through-holes on the right end of the shell (205) and the lid (206). The left end of the column (208) is set inside the trough-hole of the lid (206) in sealed connection, and the contact (209) is set inside the shell (205)

in sealed connection as well. The contact battle (210) is set on the right end of the column (208). The spring (212) covers the column (208) with one side against the contact baffle (210) and the other side against the lid (206). Inside the shell (205), the damping oil (213) is filled in the space between the lid (206) and the contact baffle (210). The contact baffle (210) has the damping hole (211), which connects spaces of the left and right side of the contact baffle (210). There is clearance between the inner surface of the shell (205) and the exterior margin of the contact baffle (210). The positioning screw (214) is set on the surface of the right side of the shell (205), corresponding to the connect plug (207). The positioning hole (215) is set on the surface of the left side of the connect plug (207), corresponding to the shell (205). The first sealing coil (216) is set between the left end of the contact column and the trough-hole of the lid (206). The first sealing coil (216) is also set between the contact (209) and the trough-hole of the shell (205). The diameter's middle part of the damping hole (211) is smaller than its whole diameter. When the connect plug (207) installed on the battery pack moves to the left, the connect plug (207) holds against the contact (209) and compress the spring, making the two surfaces closely contacted to conduct power. The function of the contact (209) is to conduct high voltage from the battery pack to the electric vehicle. When the contact (209) is pressed by the connect plug (207) on the battery pack, it shrinks back to the left. The positive pressure increases as the press increases, which make the connect plug (207) and the contact (209) closely connected. When the vehicle shakes or changes speed during driving, the contact (209) tends to move. The non-conductive damping oil (213) is filled in the shell (205). The contact (209) can only be moved to the left after overcoming the damping of the non-conductive damping oil (213). Thus quick move is impossible, but slow move still occurs. The contact 209 can be moved slowly to the left under external force. When the contact (209) moves to the left, the oil pressure at the left side of the contact (209) increases. The oil can only slowly flow to the front though the damping hole (211) set on the contact (209) or the gaps beside edges, which can efficiently avoid power disconnection caused by the quick movement of the contact when the vehicle shakes or changes speed, and avoid damaging to the contact (209) caused by arc discharge.

In FIG. 29 and FIG. 11, the first sealing ring (178) of the outer-inner double sealing ring is set inside the first framework (179) of the first electrical plug plate (177). On the plug of the first electrical connector (175), the first sealing ring (178) is set in circle outside the first strong contact (185), the second strong contact (190), the third strong contact (193) the fourth strong contact (198) and the first signal control line contact (186). Inside the socket box (180) of the first battery pack socket base (176), there are the fifth strong damping contact (187), the sixth strong damping contact (189), the seventh strong damping contact (191), the eighth strong damping contact (197), the first signal control line socket box (188), the first socket (192), the second socket (182), the third socket (183), the fourth socket (196) and the first signal control line socket (184). The first socket's wire (192) is connected to the seventh strong damping contact (191), the second socket's wire (182) is connected to the fifth strong damping contact (187), the third socket's wire (183) is connected to the sixth strong damping contact (189), the wire of the fourth socket (196) is connected to the eighth strong damping contact (197), the signal line of the first signal control line socket (184) is connected to the first signal control line socket box (188). An elastic part is set on the first signal control line socket box (188). When the first signal control line contact (186) pushes the first signal control line socket box (188), it makes the first signal control line socket box (188) closely against the first signal control line contact (186) through this elastic part. The first strong contact (185) is connected to the first power line (23), the second strong contact (190) is connected to the second power line (24), the fourth strong contact (198) is connected to the ground wire (30) of the first battery pack (3)'s first SPD. The first signal control line contact (186) is connected to the first control line and the BMS signal line (20) in the first battery pack (3). The second socket (182) and the third socket (183) is connected to the strong current line of the vehicle (1). The first signal control line socket (184) is connected to the signal control line of the vehicle. One end of the first rubber pad (195) is connected to the socket box (180), the other end is connected to the first battery pack socket base (176). The first screw (194) is set in the first rubber pad (195). The first electrical connector (175) is installed at the front of the first battery pack (3), when the first bracket (108) of the control system (11) pushes the first battery pack (3) to its installing place, the first electrical connector (175) connects with the first battery pack socket base (176) of the first battery pack (3). The third strong contact (193) pushes and closely holds against the seventh strong current damping contact (191). The first strong contact (185) pushes and closely holds against the fifth strong current damping contact (187). The second strong contact (190) pushes and closely holds against the sixth strong current damping contact (189). The fourth strong contact (198) pushes and closely holds against the eighth strong current damping contact (197). The first signal control line's contact (186) is connected to the first signal control line's socket (188). The sealing ring (178) moves along with the first battery pack (3). The two sealing arcs on the sealing ring combine with the flat surface, forming two circular sealing line around the contact alter deforming.

In FIG. 29, FIG. 13 and FIG. 17, the first vent-pipe connector (280) of the first socket is connected to the vent control system of the vehicle (1). The first vent-pipe connector (280) is connected to the first vent-pipe (281) of the first socket. The first vent-pipe (281) is connected to the first vent-pipe damping socket (282). The second vent-pipe connector (283) of the first socket is connected to the second vent-pipe (284). The second vent-pipe (284) is connected to the damping socket (285). The first air inlet port (279) of the first plug is connected to the second air inlet-outlet port. When outside air enters the air passageway (274), it flows to the case of the first battery pack (3) through the first air inlet-outlet port (275) to cool the first battery pack (3), after that the air flows out from the first plug's first outlet port (278). The first plug first outlet port (278) is connected to the damping socket (282). The place between the first air inlet port (279) and the damping socket (285) is hollow that can ventilate. The sealing ring (178) surrounds the first plug's first outlet port (278) and the first an inlet port (279) into a isolated circular sealing structure. Then the sealing ring (178) separates the first plug's first outlet port (278) from the first air inlet port (279) in the middle.

In FIG. 30 and FIG. 28, the second connector plug (254) is set at the front of the second battery pack (4). The second socket (262) is installed on the battery pack hanging bracket (220) of the vehicle (1). Inside the second framework (260) on the plug plate (263), there is a second sealing ring (261) with integrated outer ring and inner ring. The second sealing ring (261) is circled around the outside of the ninth strong current contact (253), the tenth strong current contact (255), the eleventh strong current contact (258), the twelfth strong current contact (259) and the second signal control contact (256) on the second connector plug (254). Inside the socket box (249), there is the thirteenth strong damping contact (239), the fourteenth strong damping contact (241), the fifteenth strong damping contact (246), the sixteenth strong damping contact (248) and the second signal control line socket box (244), the fifth socket (240), the sixth socket (242), the seventh socket (245), the eighth socket (248) and the second signal control line socket (244); the wire of the fifth socket (240) is connected to the thirteenth strong damping contact (239), the wire of the fifteenth strong damping contact (246) is connected to the fourteenth strong damping contact (241), the wire of the seventh socket (245) is connected to the fifteenth strong damping contact the fifteenth strong electric damping contact (246), the wire of the eighth socket (247) is connected to the eighth socket (248), the signal line of the second signal control line socket (243) is connected to the second signal control line junction box (244). The tenth strong electric contact (255) is connected to the second power line (42) of the second battery pack (4). The eleventh strong current contact (258) is connected to the forth power line of the second battery pack (4). The ninth strong electric contact (253) is connected to the ground line (47) of the second power's SPD. The twelfth strong current contact (259) is connected to the second signal line protector's ground wire (34) of the second battery pack (4). The sixth socket (242) and the seventh socket (245) are connected to the strong current line of the vehicle (1). The second signal control line socket (243) is connected to the inner signal control line of the vehicle (1). The second elastic parts include the second rubber pad (251) with one end connecting with the socket box (249) and the other end connecting with the second bracket (262), the second screw (250) set inside the second rubber pad (251). When the second signal control line's junction box (244) and the second bracket (262) connects after the second bracket (109) of the robot control system (14) pushes the second battery pack (4) into the installing place, the ninth strong electric contact (253) pushed and closely holds against the thirteenth strong electric damping contact (239), the tenth strong current contact (255) pushed and closely holds against the fourteenth strong damping contact (241), the eleventh strong current contact (258) pushes and closely holds against the fifteenth strong damping contact (246), the twelfth strong current contact (259) pushes and closely holds against the eighth socket (248), the second signal control contact (256) is connected to the second signal control line's junction box (244). Elastic parts are set on the second signal control line socket (244), when the second signal control contact (256) pushes the second signal control line junction box (244), it makes the second signal control line junction box (244) closely holds against the second signal control contact (256). The second sealing ring (261) moves along with the second battery pack (4). It's two sealing arcs combine with the flat surface and changes in form, forming two circuits sealing line.

In FIG. 30, FIG. 17 and FIG. 14, the second socket's first air-vent connector (267) is connected to the air-vent control system of the vehicle (1) and to the second socket's first air-vent (268). The second socket's first air-vent (268) is connected to the second socket's first air-vent damping socket (269). The second socket's second air-vent connector (270) is connected to the second socket's second air-vent (271). The second socket's second air-vent (271) is connected to the second socket's second air-vent damping socket (277). The second plug's first inlet port (271) is connected to the first inlet-outlet port (275). When the air enters the air passageway (274), the air flows to the case of the second battery pack (4) through the second an inlet-outlet port (276) to cool the second battery pack (4), after that the air flows out from the second plug's first outlet port (272). The place between the second socket's first air-vent damping socket (269) and the second plug's first outlet port (272) is hollow that can ventilate. The place between the second socket's second air-vent damping socket (277) and the second plug's first inlet port (273) is also hollow and can ventilate. The sealing ring (261) surrounds the second plug's first outlet port (272) and the second plug's first inlet port (273) into a isolated circular sealing structure. Then the sealing ring (261) separates the second plug's first outlet port (272) from the second plug's first inlet port (273) in the middle.

The invention claimed is:
1. The battery pack replacement and explosion-proof system controlled by Internet of things on electric vehicle's chassis, the system includes:
   a battery pack automatic swapping and explosion-proof system (5) on the electric vehicle chassis (2) includes the first battery pack spot (32) and the second battery pack spot (33);
   the first battery pack spot (32) was set at the middle-front part of the electric vehicle chassis (2), while the second battery pack spot (33) was at the middle-back part;
   when in use, the first battery pack (3) will be placed in the first battery pack spot (32) and the second battery pack 43 will be placed in the second battery pack spot (33), which makes the barycenter of the vehicle to be at its middle part;
   set the battery pack bracket wire channel (49) and the first battery pack's electrical connector seat (176) and the second battery pack's electrical connector seat (262) on the battery pack suspension bracket (220), then fix the battery pack suspension bracket (220) under the inner roof of the system (5) with screws through the first fixed port (50) and the second fixed port (51);
   install the first battery pack robot control system (11) and the second battery pack robot control system (14) inside the system (5);
   the vehicle wheel (10) consists of the hub (99) made of metal and the tyre (100) made of conductive rubber, which can transfer current from the ground wire of each part to the ground, the switching unit (222) consists of the first battery pack (3) and the second battery pack (4), which are both independent power supply set on the electric vehicle (1);
   the outlet end of the first battery pack (3) is connected to that of the second battery pack (4) in parallel, and the first battery pack (3) is the priority power supply while the second battery pack (4) is the backup power supply;
   the switching unit (222) is configured as following: when the SOC of the first battery pack (3) is less than the predefined threshold value, it will be switched to the second battery pack (4) for power supply;
   SOC is short for State of Charge, referring to the ratio of charging capacity to rated capacity, represented by percentage;
   the battery has rated capacity in a certain rate of charge for a certain time, and the driver can get the state of power and charging, and the preset threshold is 5%-8%;
   on the inner line of the first battery pack's output is the first major relay (7), which is connected to the first diode (6) in parallel; on the inner line of the second battery pack's outlet is the second major relay (8), which is connected to the second diode (9) in parallel;

in normal driving, the first battery pack (3) is the supply power in general, and the first major relay (7) is on and the second major relay is off at this time;

both the first battery pack (3) and the second battery pack (4) contain several single battery (54) that can be separated disassembled;

the first battery pack (3) and the second battery pack (4) contain N (N.gtoreq.1, and is integer) single battery (54) system acquisition board LECU and one master board of battery system BMU, and the former mainly collects the voltage and the temperature of single battery (54), while the latter mainly collects the current value inspected by the current sensor, which serves as the major reference for SOC calculation;

BMU inspects the on and off state of the relay for safety monitoring;

when the electric vehicle (1) is in driving state, the switch unit (222) is configured as: switch off the first major relay (7), and the first battery pack (3) conducts external power supply through the first diode (6);

switch on the second major relay (8), and the second battery pack (4) conducts external power supply through the second diode (8);

when the voltage of the second battery pack (4) is greater than that of the first battery pack (3), the first unbidirectional conducting diode (6) is switched off;

when the electric vehicle (1) is stopped, the switch unit (222) is configured as: set the low pressure system of the first battery pack (3) into sleep mode by controlling the gateway controller;

in the restart process of the electric vehicle (1), the low pressure system of the second battery pack (4) is on while that of the first battery pack (3) was off, thus to supply power only through the second battery pack (4) an operation switch: when the first battery pack (3) needs to be switched to the second battery pack (4), firstly, switch off the first major relay (7) of the first battery pack (3) and conduct external power supply through the first diode (6), then switch on the second major relay (8) of the second battery pack (4), at this moment, the two battery packs conduct external power supply together;

since the voltage of the second battery pack (4) is larger than that of the first battery pack (3), the first diode (6) will not conduct current from the opposite way and stop voltage output, thus there will be no voltage jump or potential difference between the two battery packs, then the gateway controller will make the low pressure system of the first battery pack (3) enter sleep mode and complete smooth switch a stop switch: when the SOC of the first battery pack (3) is to low, after the vehicle is stopped, the low pressure system of (4) enters sleep state by controlling the gateway controller;

When the vehicle is restarted, only need to start the electrical system of the second battery pack (4) to complete the switch an emergency handling: when the temperature of the first battery pack (3) suddenly reaches the warning temperature, such as 150.degree., the first battery pack (3) will be shifted to the second battery pack (4) immediately;

if the temperature of the first battery pack (3) keeps rising after surpassing the warning temperature, the robot system (11) that controls the first battery pack (3) will be started at once;

under the drive of the engine, the first bracket (108) under the first link rod (113) will separate itself from the first battery pack (3) together with the first link rod (113);

the first bearing platform (257) on the first bracket (108) is gradually separated from the first fixed platform (226) of the first battery pack (3), and the first bracket (108) is separated from the first battery pack (3), which is automatically separated from the vehicle chassis (2) and falls onto the floor;

when the temperature of the second battery pack (4) suddenly reaches the warning temperature, such as 150.degree., the second battery pack (4) will be shifted to the first battery pack (3) immediately;

if the temperature of the second battery pack (4) keeps rising after surpassing the warning temperature, the second battery pack robot system (14) will be started as once; under the drive of the engine, the second bracket (109) under the first link rod (113) will separate itself from the second battery pack (4) together with the first link rod (113); the second bearing platform (252) on the second bracket (109) is gradually separated from the second fixed platform (225) of the second battery pack (4), and the second bracket (109) separates from the second battery pack (4), which automatically separates from the vehicle chassis (2) and falls onto the floor;

if the first battery pack (3) and the second battery pack (4) both reach 150 degree with the temperature keeping rising, the first battery pack robot system (11) and the second battery pack robot system (14) can be started at the same time to respectively get rid of the first battery pack (3) and the second battery pack (4);

the vehicle mounted device (290) of the electric vehicle battery swapping system network 300 with Internet of Things (IOT) structure contains main control module, CAN bus communication module, 3G/4G wireless communication module (288), GPS data receiving and processing module (287) and user interface module;

the CAN bus communication module is in both way junction with the main control module via SPI;

3G/4G wireless communication module (288), GPS data receiving and processing module (287) and user interface module are all in both-way junction with the main control module via serial ports;

the main control module includes the master controller and an embedded operating system;

the LCD screen is connected with the main control board through the liquid crystal socket, and is used for human-computer interaction display;

the embedded operating system provides permission for accessing to the framework application program, and offers drive module as well as TCP/IP protocol stack;

the master controller includes a 32/64 bit microprocessor that is connected to the major control board's ARMCortex-A8 series through a pin, ROM clock, RAM clock and reset circuit; both the hydraulic controller (120) and the servo motor controller (127) are connected to the master controller (117) in the first battery pack robot system (11) and the second battery robot system (14);

the hydraulic controller (120) is connected with the multichannel depressurizing amplifier (123), which is connected with electro-hydraulic proportional valve (124) that is used to drive the up-down moving cylinder (114) of the first link rod (113); the servo motor controller (127) is connected with the multichannel servo amplifier (125), which is connected to the servo motor (115) used to drive the first link rod (113);

the servo motor (115) is connected to the first link rod (113) through the reducer (116);

the hydraulic controller (120) is also connected with the displacement sensor (121) used to inspect the moving distance of the first link rod (113) and the pressure sensor (122) used to inspect the internal hydraulic oil pressure of the cylinder (114);

the servo motor controller (127) is also connected with the photoelectric encoder (126) for detecting the resolution speed of the power output shaft of the reducer (116);

the master controller (117) is also connected with the camera (118) used for recording robot hand movement and the display screen (119) used to display robot hand movement;

the hydraulic controller (120) and the servo motor controller (127) communicate with the master controller (117) through the CAN bus;

the master controller (117) receives the remote terminal's instruction via the RS232 data line and distribute missions to the hydraulic controller (120) and the servo motor controller (127) to control the robot hand for series of movements by CAN bus; the output of the hydraulic controller (120) is connected to the multi-channel depressurizing amplifier (123), and it controls the cylinder (114) through electro-hydraulic proportional salve (124);

the output end of the servo motor controller (127) is connected to the multichannel servo amplifier (125), which is connected to the servo motor (115) to control the reducer (116) through the servo motor (115);

the environment is collected by the camera (118), and the operation process of the robot hand is displayed on the display screen (119);

the displacement sensor (121) is arranged on the robot hand to avoid collision with the external environment nine steps of the swapping of the first battery pack (3) and the second battery pack (4) using the battery pack swapping and explosion-proof system controlled by the Internet of things on electric vehicle chassis;

step 1: the driver of the vehicle (1) contacts the third monitoring station (292) using the vehicle mounted device though 3G/4G and other wireless network, and find out the nearest battery swapping station (221) for electric vehicles;

when the vehicle arrives the nearest battery swapping station (221), drive the vehicle (1) to the four-column vehicle lifting machine (101), and start the remote battery swapping monitoring mode controlled by the third monitoring station (292) on the LCD screen of the vehicle mounted device;

step 2: the operator of station (292) hands over the battery swapping procedure to the first monitoring station (293) through network, and the first monitoring station (293) starts remote monitoring;

the vehicle battery swapping network enters working state from the waiting state, and the ferry robot (103) walks to the first battery pack spot (32) under the battery automatic swapping system (5) of the vehicle (1) along the steel rail (104);

the battery pack tray (159) holds against the first battery pack (3), and the operator of the first monitoring station (293) starts the first battery pack robot control system (11); drove by the motor device, the first bracket (108) installed under the link rod (113) starts to be separated from the first battery pack (3), and the first bearing platform (257) on the first bracket (108) is gradually separated from the first fixed platform (226) of the first battery pack (3), and then the bracket (108) is separated from the first battery pack (3);

the ferry robot (103) drives the first battery pack (3) away from the first bearing platform (52), and the first battery pack robot control system (11) stops work;

the ferry robot (103) vehiclerying the first battery pack (3) walks to the battery unload place of the first stack robot (102) along the steel rail (104), then the stack robot (102) unloads the first battery pack (3);

step 3: the first stack robot (102) grabs the charged first battery pack (3) and put it onto the battery tray (159) on the top of the ferry robot (103);

step 4: the ferry robot (103) walks to the four-column vehicle lifting machine (101) along the rail (104), and after the X/Y direction positioning of the ferry robot (103), the listing process of the robot is calculated by the difference between the output of the ultrasonic ranging sensor and the output of the hydraulic mechanism encoder, which serves as the input of the PID controller to control the proportional flow valve (the positioning is considered as precise when the hydraulic mechanism is lifted to the preset position);

when the first monitoring station (293) sends the order of installing the first battery pack (3) to the ferry robot (103), the ferry robot (103) will hold against the first battery pack (3) to the first battery pack spot (32) on the battery pack automatic swapping system (5), then the operator of the first monitoring station (293) starts the first battery pack robot control system (11) to push the first battery pack (3) and make the first fixed platform (26) of the first battery pack (3) enter the battery bracket first bearing platform (52);

when the first connector plug (175) is closely linked to the first battery pack socket (176), the installation of the first battery pack (3) is completed, and the first battery pack robot control system (11) stops work, then the ferry robot (103) leaves the vehicle lifting machine (101) along the rail (104) step 5;

the ferry robot (103) walks to the four-column vehicle lifting machine (101) along the rail (104), and reaches the second battery pack spot (33) of the second battery pack (4) under the vehicle chassis (2);

the battery tray (159) holds against the second battery pack (4), and the operator of the first monitoring station (203) starts the second battery pack robot system (14); drove by the motor device the second bracket (109) installed under link rod (113) starts to be separated from (113), then the second bearing platform (252) on the second bracket (109) is gradually separated from the second fixed platform (225) of the second battery pack (4), and the second bracket (109) is separated from the second battery pack (4), then the second battery pack robot system (14) stops work;

the second battery pack (4) falls onto the battery tray (159) on the top of the ferry robot (103);

the ferry robot (103) vehiclerying the second battery pack (4) walks to the battery unload place of the first stack robot (102) along the steel rail (104), then the stack robot (102) unloads the second battery pack (4);

step 6: the first stack robot (102) grabs the charged the second battery pack (4) and put it onto the battery tray (159) on the top of the ferry robot (103);

step 7: the ferry robot (103) walks to the four-column vehicle lifting machine (101) along the rail (104), after the X/Y direction positioning of the ferry robot (103), the listing process of the robot is calculated by the difference between the output of the ultrasonic ranging sensor and the output of the hydraulic mechanism encoder, which serves as the input of the PID controller to control the proportional flow valve (the positioning is considered as precise when the hydraulic mechanism since lifted to the preset position);

when the first monitoring station (293) sends the installing order to the ferry robot (103), the ferry robot (103) will hold against the second battery pack (4) to the second battery pack spot (33) under the chassis (2) and the tray (159) pushes the second battery pack (4) to the second battery pack spot (33);

the operator of station (293) starts the second battery pack robot system (14) to push the second battery pack (4) and make the first fixed platform (46) of the second battery pack (4) enter the battery bracket second bearing platform (53), the second connector plug (254) is closely linked to the second battery pack socket (262), and when the installation of the second battery pack (4) is completed, the second battery pack robot system (14) stops work, and the ferry robot (103) leaves the vehicle lifting machine (101) along the rail (104);

step 8: when the battery swapping process is completed, the vehicle lifting machine (101) descends, and the driver of the vehicle (1) drives away from the swapping station;

step 9: the first monitoring station (293) sends the signal of completing the battery swapping, then the entire battery swapping station (221) returns to the original spot; the first battery pack's case (223) and the second battery pack's case (224) both are made of the battery pack's case (199), which contains the upper lid (200) and the base (201);

the front side of the base (91) has a setting-in connector plug (203), which can be constructed as the first connector plug (175) or the second connector plug (254); the upper lid (200) of the case (199) is shorter than the trapezoidal frame of bottom margin (174) on the base (201);

install the first temperature adjustment panel (12) and the second temperature adjustment panel (13) on the battery swapping system (5) with several fixing port (266);

the panel (12) is installed over the first battery pack spot (32) while the panel (13) is installed over the second battery pack spot (33);

the first connecting tube (95) and the second connecting tube (96) link the panel (12) and the panel (13) together, and the coolant inlet (97) and the coolant outlet (98) are set on the panel (12) first battery pack (3) is put into the first battery pack's case (223), the first shielding conduit (21) bent into 90.degree. and the second shielding conduit (22) bent into 90.degree. (both are made of magnetic and electronic conductive metal) are fixed inside the first battery pack's case (223), in which the first signal line protector (16) is also installed, the first control line and the BMS signal line (20) enter the inner front of the first battery pack's case (223) along the first shielding conduit (21) and is connected to the first connecting spot (19) with the first conduit (17) of the first signal line protector (16);

the first signal line protector's second wire (18) is connected with the PCB signal outlet line (69) of the first battery pack (3); the first control line, the BMS signal line (20) and the first signal line protector (16) are in series connection, and the first connection spot (19) unloads and absorbs current flowing along the first control line and the BMS signal line (20);

the first signal line protector's ground line (15) is connected to the first power surge protector's ground line (30);

install the first power's (31) inside the first battery pack's case (223), the first power line (23) enters into the first battery pack's case (223) along the second shielding conduit (22) and is connected at the second connecting spot (25) with the first conduit (28) of the first power;

the first power line (23) is connected to the positive terminal (66) of the first battery pack (3), and the second power line (24 enters into the first battery pack's case (223) along the second shielding conduit (22) and is connected at the second connecting spot (27) with the second conduit (27) of the first power;

the second power line (24) is connected to the negative terminal (71) of the first battery pack (3), and the ground line (30) of the first power's is connected to the forth electrical contact (198) of the plug (176);

the second connecting spot (25) unloads and absorbs the current flowing along the first power line (23), and the third connecting spot (27) unloads and absorbs current flowing along the second power line (24);

install the second power (229) inside the first battery pack's case (223), and the first conduit (227) of the third power's is connected to the outer surface of the first battery pack (3);

the second conduit (228) of the third power is connected to the inner surface of the first battery pack's case (223), which unloads and absorbs the current induced from the first battery pack's case (223);

the ground line (230) of the third power is connected to the first power surge protector's ground line (30), and the first signal line protector's ground line (15), the first power surge protector's ground line (30) and the ground line (230) of the third power's, are in equipotential connection;

the current is conducted from the above three lines to the ground line's forth electrical contact (198), then to the ground system of the vehicle (1), finally to the earth through the wheel;

the second battery pack (4) is put into the second battery pack's case (224), and the third shielding conduit (38) bent to 90.degree. and one forth shielding conduit (41) bent to 90.degree. (both are made of magnetic and electronic conductive metal) are fixed inside the second battery pack's case (224), in which the second signal line protector (35) is also installed, the second control line and the BMS signal line (40) enter the inner front of the second battery pack's case (224) along the third shielding conduit (38) and is connected to the forth connecting spot (39) with the second signal line protector's second wire (37);

the first conduit (36) of the second signal line protector (35) is connected with the PCB signal outlet line (69) of the first battery pack (3);

the first control line, the BMS signal line (40) and the second signal line's protector (35) are in series connection;

the forth connection spot (39) unloads and absorbs current flowing along the second control line and the BMS signal line (40), and the second signal line protector's ground wire (34) is connected to the ground line (47) of the second power's SPD;

the second battery pack (4) is put into the second battery pack's case (224), and the third shielding conduit (38) bent 90.degree. and the forth shielding conduit (41) bent into 90.degree. (both are made of magnetic and electronic conductive metal) are fixed inside the second battery pack's case (224); the third power's surge protector (48) is installed inside the second battery pack's case (224), and the third power line (42) enters into the second battery pack's case (224) along the forth shielding conduit (41) and is connected to the fifth connecting spot (43) with the second wire (238) of the second power;

the third power line (42) is connected to the positive terminal (66) of the second battery pack (4);

the forth power line (44) enters into the second battery pack's case (224) along the forth shielding conduit (41) and is connected to the sixth connecting spot (45) with the second power surge protector's first wire (237); the forth power line (29) is connected to the negative terminal (71) of the second battery pack (4);

the ground line (47) of the second power's SPD is connected to the ninth electrical contact (253) of the second plug (254);

the fifth connecting spot (43) unloads and absorbs the current flowing along the third power line (42), and the sixth connecting spot (45) unloads and absorbs current flowing along the forth power line (44);

the forth power's SPD (234) is installed inside the second battery pack's case (224), and the first conduit (232) of the forth power's SPD is connected to the outer surface of the second battery pack (4), while the second wire (233) of the forth power's SPD is connected to the inner surface of the second battery pack's case (224), and the ground line (235) of the forth power's is connected to the ground line (47) of the second power's SPD;

the ground line (47) of the second poster's SPD, the ground line (235) of the forth power's SPD and the second signal line protector ground wire (34) are in equipotential connection;

the current is conducted from the above three lines to the ground line's ninth electrical contact, then to ground system of the vehicle (1), finally to the earth through the wheel (10) is usually connected to the power line in parallel in the circuit;

the battery pack shell (63) consists of the frame, the upper lid (64) and the lower lid (65); the positive terminal (66) and the negative terminal (71) are set on the upper lid (64);

the circuit board (67) is connected to each battery through wires, and the signal output line (69) is set on the circuit board;

inside the battery pack shell (63), there are the single battery (64) with several positive and negative terminals set on both sides, and the battery array consists of adjacent batteries with opposite polarity in combination permutation;

the positive and negative electrodes of the adjacent batteries are connected through the connection strap (55);

on the top surface and bottom surface of the battery array, the upper support seat (56) and the lower support seat (57) are respectively set, and they are connected through several support column (60);

the circuit board protection cover (68) is set on the circuit board (67), and the signal output line (69) is out from the circuit board protection cover (68);

the connecting line of the positive terminal (73) and the negative terminal (75) in the single battery (54) both form 90.degree. angles with the extended line of the top lid (64) and the extended line of the bottom lid (65) the battery cells (84) is arranged as a regular hexagon, and the battery cells (85) is arranged as half regular hexagon, forming two kinds of the battery monomer (54);

the elastic cushion (61) is set between the bottom surface of the groove (58) of the top support seat (56) and the bottom support seat (57) and the two sides of the battery, and the elastic cushion (61) is in circular shape, and it is made of EPDM material;

insulated and heat conductive tape (62) are stuck on the connecting straps, and the groove (58) are installed on the top support seat (56) and the bottom support seat (57) to put battery in;

the intercommunicating pore (59) that can expose battery electrodes are set in the mutually connected battery indentations;

the lithium battery is positive six prismatic;

the first edge (86), the second edge (87), the third edge (88), the forth edge (89), the fifth edge (90) and the sixth edge (91) of the single battery are same in length, which includes the electric core (70), the inner shell (83), the outer shell (72), the positive pole (73) and the negative pole (75);

the inner shell (83) covers the electric core (70), the outer shell (72) covers the inner shell (83), the positive pole (73) and the negative pole (75) are respectively at the middle of the upper side surface and lower side surface of the outer shell (72);

the cover plate (76) is set on the upper side surface of the outer shell (72), on which there is the first glue injection port (77);

the second glue injection port (78) is set at the corresponding place of the lower side surface of the outer shell (72) and the first glue injection port (77);

between the inner shell (83) and the outer shell (72), the high thermal-conductive electronic silica gel (79) is filled;

both the positive pole (73) and the negative pole (75) are screwed with the matching nut (80), and the pad (81) is set between the contact surface of the nut (80) and the outer shell (72);

at the middle of the positive pole (73), the liquid injection port (82) is set, beside which there is the air-vent (74);

with high thermal conductive electronic silica gel (79) filled between the outer shell and the inner shell, the heat diffusion of the electric core (70) becomes more even, and can quickly conduct heat to the outer shell (72) and efficiently improve the seismic capacity and tightness of the lithium battery;

the pad (81) is used to fix the electric core (70) and insulate the outer shell (72), which improves electrical insulation and stability;

the liquid injection port (82) and the air-vent (74) have the functions of injecting liquid and reducing pressure for the electrolyte of lithium battery, and the battery is in ½ regular prism structure, the seventh edge (92), the eighth edge (93) and the ninth edge (94) of the single battery are same in length;

the ferry robot (141) has three degrees of freedom (X axis, Z axis and R axis), respectively being the linear walking mechanism (142), the hydraulic lifting mechanism (143) and the angle deviation mechanism (144);

the linear walking mechanism (142) is at the bottom of the ferry robot (141), containing the pulley (148), the universal shaft (145), the belt (149), the first servo motor (150), the first reducer (151) and the base (152); the two pulleys in front are the motor device of the robot, connected to a set of universal shaft; the two pulleys at the back are slave drive device, The firth servo motor (150) and the matching first reducer (151) are in expanding sleeve connection, Motor transfer between the first reducer (151) and the pulley (148) is completed through the belt (149); the pulley (148) does linear walking on the sliding rail; under the linear walking mechanism (301), there is three photoelectric switches, which respectively cooperates with the origin baffle and the front and rear limit baffles, providing in-place switch signal for the programmable logic controller (PLC) control system (161) to realize robot original spot searching and resetting and avoid cross-border operation; the front limit baffle, the origin battle and the rear limit battle are arrayed in order along the linear sliding rail, and the origin baffle is set between the front limit baffle and rear limit baffle; the hydraulic lifting mechanism (143) is above the base of the linear walking mechanism (142), containing two hydraulic telescopic cylinders, and the first level hydraulic cylinder (153) is under the second level hydraulic cylinder (154); when the first level hydraulic cylinder (153) fully extends, the second level hydraulic cylinder (154) begins to stretch; at one side of the first level hydraulic cylinder (153) and the second level hydraulic cylinder (154) is respectively soldered crossbeams and anti-rotating beams, which cooperate with the two anti-rotating holes on the soldering beam of the first level hydraulic cylinder (153) and the soldering beam of the base to avoid rotating during the process of battery lifting along with the hydraulic lifting mechanism (143); at the other side of the first level hydraulic cylinder (153) and the second level hydraulic cylinder (154), the rack (146), the encoder (147), the baffle and the first proximity switch; the baffle and the first proximity switch cooperates with each other, and the first proximity switch is set at the bottom of the beam of the first level hydraulic cylinder (153); when the first level hydraulic cylinder (153) fully extends, the baffle triggers the switch signal of the proximity switch and the second level hydraulic cylinder (154) starts stretching; the rack (146) on the side of the second level hydraulic cylinder (154) joggles with the encoder (147) through gear; the lifting height of the second level hydraulic cylinder (154) is got by calculating the revolution of the encoder (147), and the encoder (147) is connected with the PLC control system (161), which starts high speed counting; the angle deviation mechanism (144) is a the top of the hydraulic lifting mechanism (143), containing the mounting flange (155), the gear (156), the second servo motor (157) and the second reducer (158); the flange (155) is installed on the second level hydraulic cylinder (154), and the second servo motor (157), the second reducer (158) and the gear (156) are fixed on the flange (155); the small gear is installed on the second servo motor (157), while the large gear is installed on the second level hydraulic cylinder (154); the small gear and the large gear are joggled together and rotate along with the second servo motor (157); under the large gear, the baffle is set here, and there are three second proximity switches on the mounting flange (155); during rotating, the large gear triggers the signals of the left rotation limit, the right rotation limit and the galvanic reset switch to ensure the large gear rotate within the predetermined range; the battery tray (159) is installed on the angle deviation mechanism (144), The rotation center of the large gear and the gravity center of the battery tray (159) is the same one, Four stop blocks (160) are installed on the battery tray (159), and respectively couples with the four break-outs under the bottom of the battery box of the vehicle (1), which can realize slight adjustment and reliable fixing of the battery out box position; the ultrasonic ranging sensor (168) and the DMP sensor (169) are set on the battery tray (159), and the ultrasonic ranging sensor (168) is used to measure the distance between the battery tray (312) and the vehicle chassis, the DMP sensor cooperates with the reflecting panel on the vehicle chassis to calculate the target spot of the reflecting panel and gain the horizontal angle deviation of the ferry robot (141) and the vehicle; the linear walking mechanism (142) and the hydraulic lifting mechanism (143) are in linkage; the angle correction mechanism (144) only starts working when the robot (141) linearly walks and vertically lifts to the preset position; the hydraulic lifting mechanism (143) only restarts working when the battery tray (159) on the angle correction mechanism (144) meets the expected effect; the linear walking mechanism (142) and the angle correction mechanism (144) adopts servo motor drive; the drive motor is connected with the corresponding encoder, and each encoder is connected with the corresponding driver; the driver sends position pulse signal to the servo motor, and the encoder transmits the motor rotation information back to the driver to form the position mode full-closed loop control; the ferry robot (141) controls the system frame chart; the PLC system is the core part to control the movement of the robot (141), including the touch screen (162), the wireless communication module (163), the OMRON PLC controller (164), the ND module (405), the D/A module (166), etc; the wireless communication module (163) communicates with the touch screen (162) through the serial port RS485; the OMRON PLC controller (164) communicates with the touch screen (162) through the serial port RS232; the touch screen (162) communicates with the background monitoring system (167) through Internet; the ultrasonic ranging sensor (168), the DMP sensor (169), the hydraulic proportional flow valve (170), the encoder (171), the proximity switch (172), the photoelectric switch (173) and other parts conduct real time data transmission communication with PLC control system the PLC control system (161); the ultrasonic ranging sensor (168) and the DMP sensor (169) are connected to the ND module (165) in the PLC control system (161), converting the analog signals collected by sensors into digital signals, and transferring to the PLC control system (161); the hydraulic proportional flow valve (170) is connected to the D/A module (166) in the PLC control system (161), converting the digital signals into analog flow control information to achieve speed control of the hydraulic lifting mechanism (143); the encoder (171) is connected with the ND module (165) of the PLC control system (161), and collects the rising height of the side rack of the second level hydraulic cylinder (154) to calculate the lifting height of the second level hydraulic cylinder (154), and sends the data back to the PLC control system (161), forming full-closed loop control during the lifting process; the proximity switch (172) and the photoelectric switch (173) are connected to the OMRON PLC controller (164) in the PLC control system (161), and conducts real time transmission of the limit position information of each freedom degrees, which triggers the interrupt mode and high-speed counting mode inside the PLC control system (161) and realizes precise and quick movement of the ferry robot (141) within the specified scope; the contact body (204) is connected with the electrical socket, and the connect plug (207) is connected with the battery pack; the contact (209) is set at the right of the inner contact column (208) of the contact bods (204), which is closely against the connect plug (207); inside the connect plug (204), the spring (212) is set, which limits the position when the connect plug (207) push the contact (209) to the left; the contact body (204) comprises the shell (205) and the lid (206); the lid (206) is arranged on the left of the shell (205), and there are through-holes on the right end of the shell (205) and the lid (206); the left end of the column (208) is set inside the trough-hole of the lid (206) in sealed connection, and the contact (209) is set inside the shell (205) in sealed connection as well; the contact baffle (210) is set on the right end of the column (208); the spring (212) covers the column (208) with one side against the contact baffle (210) and the other side against the lid (206); inside the shell (205), the damping oil (213) is filled in the space between the lid (206) and the contact baffle (210); the contact baffle (210) has the damping hole (211), which connects spaces of the left and right side of the contact baffle (210); there is clearance between the inner surface of the shell (205) and the exterior margin of the contact baffle (210); the positioning screw (214) is set on the surface of the right side of the shell (205), corresponding to the connect plug (207); the positioning hole (215) is set on the surface of the left side of the connect plug (207), corresponding to the shell (205); the first sealing coil (216) is set between the left end of the contact column and the trough-hole of the lid (206), and the first sealing coil (216) is also set between the contact (209) and the trough-hole of the shell (205); the diameter's middle part of the damping hole (211) is smaller than its whole diameter; when the connect plug (207) installed on the battery pack moves to the left, the connect plug (207) holds against the contact (209) and compress the spring, making the two surfaces closely contacted to conduct power; the function of the contact (209) is to conduct high voltage from the battery pack to the electric vehicle; when the contact (209) is pressed by the connect plug (207) on the battery pack, it shrinks back to the left; the positive pressure increases as the press increases, which make the connect plug (207) and the contact (209) closely connected; when the vehicle shakes or changes speed during driving, the contact (209) tends to move; the non-conductive damping oil (213) is filled in the shell (205); the contact (209) can only be moved to the left after overcoming the damping of the non-conductive damping oil (213), thus quick move is impossible, but slow move still occurs; the contact (209) can be moved slowly to the left under external force, when the contact (209) is moved to the left, the oil pressure at the left side of the contact (209) increases; the oil can only slowly flow to the front through the damping hole (211) set on the contact (209) or the gaps beside edges, which can efficiently avoid power disconnection caused by the quick movement of the contact when the vehicle shakes of changes speed, and avoid damaging to the contact (209) caused by arc discharge; the first sealing ring (178) of the outer-inner double sealing ring is set inside the first framework (179) of the first electrical plug plate (177); on the plug of the first electrical connector (175), the first sealing ring (178) is set in circle outside the first strong contact (185), the second strong contact (190), the third strong contact (193), the fourth strong contact (198) and the first signal control line contact (186); inside the socket box (180) of the first battery pack socket base (176), there are the fifth strong damping contact (187), the sixth strong damping contact (189), the seventh strong damping contact (191), the eighth strong damping contact (197), the first signal control line socket box (188), the first socket (192), the second socket (182) the third socket (183), the fourth socket (196) and the first signal control line socket (184); the first socket's wire (192) is connected to the seventh strong damping contact (191), the second socket's wire (182) is connected to the fifth strong damping contact (187), the third socket's wire (183) is connected to the sixth strong damping contact (189), the wire of the fourth socket (196) is connected to the eighth strong damping contact (197), the signal line of the first signal control line socket (184) is connected to the first signal control line socket box (188); an elastic part is set on the first signal control line socket box (188); when the first signal control line contact (186) pushes the first signal control line socket box (188), it makes the first signal control line socket box (188) closely against the first signal control line contact (186) through this elastic part; the first strong contact (185) is connected to the first power line (23), the second strong contact (190) is connected to the second power line (24), the fourth strong contact (198) is connected to the ground wire (30) of the first battery pack (3)'s first SPD; the first signal control line contact (186) is connected to the first control line and the BMS signal line (20) in the first battery pack (3); the second socket (182) and the third socket (183) is connected to the strong current line of the vehicle (1); the first signal control line socket (184) is connected to the signal control line of the vehicle; one end of the first rubber pad (195) is connected to the socket box (180), the other end is connected to the first battery pack socket base (176); the first screw (194) is set in the first rubber pad (195), and the first electrical connector (175) is installed at the front of the first battery pack (3); when the first bracket (108) of the control system (11) pushes the first battery pack (3) to its installing place, the first electrical connector (175) is connected with the first battery pack socket base (176) of the first battery pack (3); the third strong contact (193) pushes and closely holds against the seventh strong current damping contact (191); the first strong contact (185) pushes and closely holds against the fifth strong current damping contact (187); the second strong contact (190) pushes and closely holds against the sixth strong current damping contact (189); the fourth strong contact (198) pushes and closely holds against the eighth strong current damping contact (197); the first signal control line's contact (186) is connected to the first signal control line's socket (188); the sealing ring (178) moves along with the first battery pack (3); the two sealing arcs on the sealing ring is combined with the flat surface, forming two circular sealing line around the contact after deforming; the first vent-pipe connector (280) of the first socket is connected to the vent control system of the vehicle (1); the first vent-pipe connector (280) is connected to the first vent-pipe (281) of the first socket; the first vent-pipe (281) is connected to the first vent-pipe damping socket (282); the second vent-pipe connector (283) of the first socket is connected to the second vent-pipe (284); the second vent-pipe (284) is connected to the damping socket (285); the first air inlet port (279) of the first plug is connected to the second air inlet-outlet port; when outside air enters the air passageway (274), it flows to the case of the first battery pack (3) through the first air inlet-outlet port (275) to cool the first battery pack (3), after that the air flows out from the first plug's first outlet port (278); the first plug first outlet port (278) is connected to the damping socket (282); the place between the first air inlet port (279) and the damping socket (285) is hollow that can ventilate; the sealing ring (178) surrounds the first plug's first outlet port (278) and the first air inlet port (270) into a isolated circular sealing structure; then the sealing ring (178) separates the first plug's first outlet port (278) from the first air inlet port (279) in the middle; the second connector plug (274) is set at the front of the second battery pack (4), the second socket (262) is installed on the battery pack hanging bracket (220) of the vehicle (1); inside the second framework (260) on the plug plate (263), there is a second sealing ring (261) with integrated outer ring and inner ring; the second sealing ring (261) is circled around the outside of the ninth strong current contact (253), the tenth strong current contact (255), the eleventh strong current contact (258), the twelfth strong current contact (259) and the second signal control contact (256) on the second connector plug (254); inside the socket box (249), there is the thirteenth strong damping contact (239), the fourteenth strong damping contact (241), the fifteenth strong damping contact (246), the sixteenth strong damping contact (248) and the second signal control line socket box (244), the fifth socket (240), the sixth socket (242), the seventh socket (245), the eighth socket (248) and the second signal control line socket (244); the wire of the fifth socket (240) is connected to the thirteenth strong damping contact (239), the wire of the fifteenth strong damping contact (246) is connected to the fourteenth strong damping contact (241), the wire of the seventh socket (245) is connected to the fifteenth strong damping contact the fifteenth strong electric damping contact (246), the wire of the eighth socket (247) is connected to the eighth socket (248), the signal line of the second signal control line socket (243) is connected to the second signal control line junction box (244); the tenth strong electric contact (255) is connected to the second power line (42) of the second battery pack (4), the eleventh strong current contact (258) is connected to the forth power line of the second battery pack (4), the ninth strong electric contact (253) is connected to the ground line (47) of the second power's SPD, the twelfth strong current contact (259) is connected to the second signal line protector's ground wire (34) of the second battery pack (4); the sixth socket (242) and the seventh socket (245) are connected to the strong current line of the vehicle (1), and the second signal control line socket (245) is connected to the inner signal control line of the vehicle (1); the second elastic parts include the second rubber pad (251) with one end connected with the socket box (249) and the other end connected with the second bracket (262); the second screw (250) set inside the second rubber pad (251); when the second signal control line's junction box (244) and the second bracket (262) is connected after the second bracket (109) of the second battery pack robot system (14) pushes the second battery pack (4) into the installing place, the ninth strong electric contact (253) pushed and closely holds against the thirteenth strong electric damping contact (239), the tenth strong current contact (255) pushed and closely holds against the fourteenth strong damping contact (241), the eleventh strong current contact (258) pushes and closely holds against the fifteenth strong damping contact (246), the twelfth strong current contact (259) pushes and closely holds against the eighth socket (248), the second signal control contact (256) is connected to the second signal control line's junction box (244); elastic parts are set on the second signal control line socket (244), when the second signal control contact (256) pushes the second signal control line junction box (244), which makes the second signal control line junction box (244) closely holds against the second signal control contact (256); the second sealing ring (261) moves along with the second battery pack (4), and it's two sealing arcs combine with the flat surface and changes in form, forming two circular sealing line; the second socket's first air-vent connector (267) is connected to the air-vent control system of the vehicle (1) and to the second socket's first air-vent (268); the second socket's first air-vent (268) is connected to the second socket's first air-vent damping socket (269); the second socket's second air-vent connector (270) is connected to the second socket's second air-vent (271); the second socket's second air-vent (271) is connected to the second socket's second air-vent damping socket (277); the second plug's first inlet port (271) is connected to the first inlet-outlet port (275); when the air enters the air passageway (274), the air flows to the case of the second battery pack (4) through the second air inlet-outlet port (276) to cool the second battery pack (4), after that the air flows out from the second plug's first outlet port (272); the place between the second socket's first air-vent damping socket (269) and the second plug's first outlet port (272) is hollow that can ventilate; the place between the second socket's second air-vent damping socket (277) and the second plug's first inlet port (273) is also hollow and can ventilate; the sealing ring (261) surrounds the second plug's first outlet port (272) and the second plug's first inlet port (273) into an isolated circular seating structure; then the sealing ring (261) separates the second plug's first outlet port (272) from the second plug's first inlet port (273) in the middle.

2. The battery pack replacement and explosion-proof system controlled by Internet of things on electric vehicle's chassis, the system includes: The automatic battery pack replacement and explosion-proof system (5) on electric vehicle chassis (2) includes one first battery pack location (32) and one second battery pack location (33); The first battery pack location (32) was set at the middle-front part of the electric vehicle chassis (2) while the second battery pack location (33) was at the middle-back part; When in use, the first battery pack (3) will be placed in location (32) and the second battery pack (4) will be placed in location (33), which makes the barycenter of the vehicle to be at its middle part, Set one battery pack bracket wire channel (49) and one first battery pack's electrical connector seat (176) and one second battery pack's electrical connector seat (262) on the battery pack suspension bracket (220), then fix the battery pack suspension bracken (220) under the inner roof of the system (5) with screws through the first fixed port (50) and the second fixed port (51), install one first battery pack robot control system (11) and one second battery pack robot control system (14) inside the system (5).

3. The battery pack replacement and explosion-proof system controlled by Internet of things on electric vehicle's chassis the system includes: Put the first battery pack (3) into the first battery pack's case (223), the first shielding conduit (21) bent into 90.degree. and one second shielding conduit (22) bent into 90.degree. (both are made of magnetic and electronic conductive metal) are fixed inside the first battery pack's case (223), in which the first signal line protector (16) is also installed, Install the first power's (31) inside the first battery pack's case (223), and install the second power (229) inside the first battery pack's case (223).

4. The battery pack replacement and explosion-proof system controlled by Internet of things on electric vehicle's chassis, the system includes: Put the second battery pack (4) into the second battery pack's case (224), the third shielding conduit (38) bent into 90.degree. and the forth shielding conduit (41) bent into 90.degree. (both are made of magnetic and electronic conductive metal) are fixed inside the second battery pack's case (224), in which the second signal line protector (35) is also installed, Install the third poster's surge protector (48) inside the second battery pack's case (224), and install the forth power's inside the second battery pack's case (224).

* * * * *